(12) United States Patent
Maeda et al.

(10) Patent No.: US 11,639,775 B2
(45) Date of Patent: May 2, 2023

(54) WAVELENGTH CONVERSION ELEMENT

(71) Applicant: SONY GROUP CORPORATION, Tokyo (JP)

(72) Inventors: Yuki Maeda, Tokyo (JP); Shota Nishi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/439,570

(22) PCT Filed: Mar. 2, 2020

(86) PCT No.: PCT/JP2020/008591
§ 371 (c)(1),
(2) Date: Sep. 15, 2021

(87) PCT Pub. No.: WO2020/195562
PCT Pub. Date: Oct. 1, 2020

(65) Prior Publication Data
US 2022/0154895 A1 May 19, 2022

(30) Foreign Application Priority Data
Mar. 26, 2019 (JP) .............................. JP2019-058236

(51) Int. Cl.
*F21K 9/64* (2016.01)
*F21V 29/503* (2015.01)
(Continued)

(52) U.S. Cl.
CPC ................. *F21K 9/64* (2016.08); *F21K 9/66* (2016.08); *F21V 29/503* (2015.01); *F21V 29/52* (2015.01)

(58) Field of Classification Search
CPC ........ H01L 33/502; F21K 9/64; F21S 41/176; F21V 29/56; F21V 9/32; F21V 9/38; F21V 9/45
See application file for complete search history.

(56) References Cited

U.S. PATENT DOCUMENTS

2016/0348857 A1* 12/2016 Miyata ..................... F21V 9/38

FOREIGN PATENT DOCUMENTS

| JP | 2002-168575 | 6/2002 |
| JP | 2016-225148 | 12/2016 |

(Continued)

OTHER PUBLICATIONS

International Search Report prepared by the Japan Patent Office dated Apr. 23, 2020, for International Application No. PCT/JP2020/008591, 2 pages.

*Primary Examiner* — William J Carter
(74) *Attorney, Agent, or Firm* — Sheridan Ross P.C.

(57) ABSTRACT

A first wavelength conversion element according to an embodiment of the present disclosure includes: a phosphor layer; a refrigerant; a refrigerant transport member; and a housing. The phosphor layer includes a plurality of phosphor particles. The phosphor layer has a gap therein. The refrigerant cools the phosphor layer. The refrigerant transport member is provided in contact with the phosphor layer. The refrigerant transport member circulates the refrigerant. The housing encapsulates the phosphor layer, the refrigerant, and the refrigerant transport member. The housing includes a protective layer on at least a portion of an inner wall.

19 Claims, 22 Drawing Sheets

(51) Int. Cl.
*F21V 29/52* (2015.01)
*F21K 9/66* (2016.01)

(56) References Cited

FOREIGN PATENT DOCUMENTS

| | | |
|---|---|---|
| JP | 2017-027685 | 2/2017 |
| JP | 2017-106695 | 6/2017 |
| JP | 2017-168790 | 9/2017 |
| WO | WO 2019/039445 | 2/2019 |

* cited by examiner

WAVELENGTH CONVERSION ELEMENT

CROSS REFERENCE TO RELATED APPLICATIONS

This application is a national stage application under 35 U.S.C. 371 and claims the benefit of PCT Application No. PCT/JP2020/008591 having an international filing date of 2 Mar. 2020, which designated the United States, which PCT application claimed the benefit of Japanese Patent Application No. 2019-058236 filed 26 Mar. 2019, the entire disclosures of each of which are incorporated herein by reference.

TECHNICAL FIELD

The present disclosure relates to a wavelength conversion element including a phosphor particle.

BACKGROUND ART

Typical phosphor light sources each adopt a method in which a phosphor is fixed onto a wheel and the wheel is rotated to dissipate the heat generated by laser radiation. Further, for example, PTL 1 discloses a phosphor wheel that increases the cooling efficiency of a phosphor by encapsulating a refrigerant along with the phosphor in a sealed housing provided on a rotation substrate.

CITATION LIST

Patent Literature

PTL 1: Japanese Unexamined Patent Application Publication No. 2017-27685

SUMMARY OF THE INVENTION

Incidentally, a wavelength conversion element including a phosphor as a light source is requested to increase the output power and the reliability.

It is desirable to provide a wavelength conversion element that makes it possible to increase the output power and the reliability.

A first wavelength conversion element according to an embodiment of the present disclosure includes: a phosphor layer; a refrigerant; a refrigerant transport member; and a housing. The phosphor layer includes a plurality of phosphor particles. The phosphor layer has a gap therein. The refrigerant cools the phosphor layer. The refrigerant transport member is provided in contact with the phosphor layer. The refrigerant transport member circulates the refrigerant. The housing encapsulates the phosphor layer, the refrigerant, and the refrigerant transport member. The housing includes a protective layer on at least a portion of an inner wall.

The first wavelength conversion element according to the embodiment of the present disclosure is provided with the protective layer on at least the portion of the inner wall of the housing that encapsulates the phosphor layer, the refrigerant, and the refrigerant transport member. This suppresses contact between the refrigerant and the housing.

A second wavelength conversion element according to an embodiment of the present disclosure includes: a phosphor layer; a refrigerant; a refrigerant transport member; and a housing. The phosphor layer includes a plurality of phosphor particles. The phosphor layer has a porous structure therein. The porous structure changes in average pore size from one surface to a light emitting section on another surface. The refrigerant cools the phosphor layer. The refrigerant transport member is provided in contact with the phosphor layer. The refrigerant transport member circulates the refrigerant. The housing encapsulates the phosphor layer, the refrigerant, and the refrigerant transport member.

The second wavelength conversion element according to the embodiment of the present disclosure changes the average pore size of gaps distributed in the phosphor layer having the porous structure from the one surface to the light emitting section on the other surface. This increases the cooling performance and reduces the entry of the foreign objects to the light emitting section and the region near the light emitting section.

BRIEF DESCRIPTION OF DRAWING

FIG. 33 is an outline diagram illustrating an example of a configuration of a light source module including the wavelength conversion element illustrated in FIG. 1 or the like.

FIG. 34 is an outline diagram illustrating another example of the configuration of the light source module including the wavelength conversion element illustrated in FIG. 1 or the like.

FIG. 35 is an outline diagram illustrating another example of the configuration of the light source module including the wavelength conversion element illustrated in FIG. 1 or the like.

FIG. 36 is an outline diagram illustrating another example of the configuration of the light source module including the wavelength conversion element illustrated in FIG. 1 or the like.

FIG. 37 is an outline diagram illustrating an example of a configuration of a projector including the light source module illustrated in FIG. 33 or the like.

FIG. 38 is an outline diagram illustrating another example of the configuration of the projector including the light source module illustrated in FIG. 33 or the like.

MODES FOR CARRYING OUT THE INVENTION

The following describes embodiments of the present disclosure in detail with reference to the drawings. The following description is a specific example of the present disclosure, but the present disclosure is not limited to the following modes. In addition, the present disclosure is not also limited to the disposition, dimensions, dimension ratios, and the like of the respective components illustrated in the respective diagrams. It is to be noted that description is given in the following order.

1. First Embodiment (Example in which protective layer is provided on inner wall of storage section included in housing)
1-1. Configuration of Wavelength Conversion Element
1-2. Workings and Effects
2. Modification Examples
2-1. Modification Example 1 (Example in which refrigerant transport member having flow path is used)
2-2. Modification Example 2 (Example of transmissive wavelength conversion element)
2-3. Modification Example 3 (Example of reflective wavelength conversion element that is rotatable around rotation axis)
2-4. Modification Example 4 (Example of transmissive wavelength conversion element that is rotatable around rotation axis)
2-5. Modification Example 5 (Example in which protective layer is further provided on inner surface of cover glass)
2-6. Modification Example 6 (Example in which refrigerant transport member is formed by using particle or fibrous structure)
3 Second Embodiment (Example in which phosphor layer having average pore size distribution is used)
3-1. Configuration of Wavelength Conversion Element
3-2. Workings and Effects
4. Modification Examples
4-1. Modification Example 7 (Another example of average pore size distribution)
4-2. Modification Example 8 (Another example of average pore size distribution)
4-3. Modification Example 9 (Example in which side wall of phosphor layer is inclined)
4-4. Modification Example 10 (Example in which porous layer is provided between phosphor layer and cooling transport member)
4-5. Modification Example 11 (Example of transmissive wavelength conversion element)
4-6. Modification Example 12 (Example in which opening right below light emitting region is filled with glass)

4-7. Modification Example 13 (Example of combination of first embodiment and second embodiment)
5. Application Example (Examples of light source module and projector)

1. First Embodiment

Figure 1:
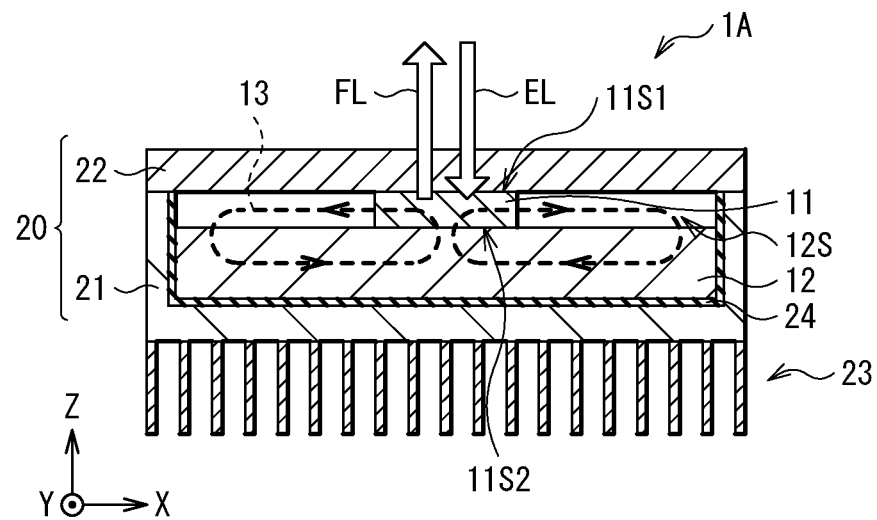
FIG. 1 is a cross-sectional schematic diagram illustrating an example of a configuration of a wavelength conversion element according to a first embodiment of the present disclosure.
Figure 2:
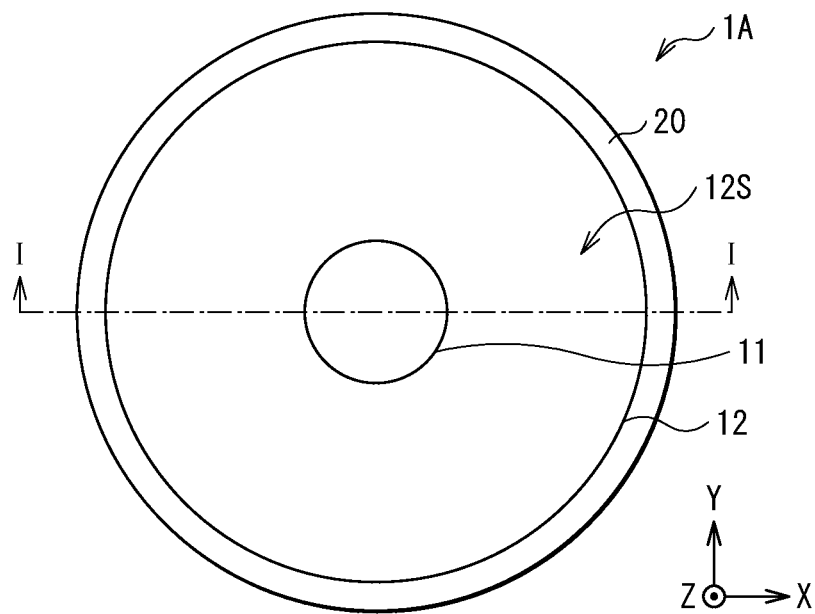
FIG. 2 is a plane schematic diagram of the wavelength conversion element illustrated in FIG. 1.

FIG. 1 schematically illustrates an example of a cross-sectional configuration of a wavelength conversion element (wavelength conversion element 1A) according to a first embodiment of the present disclosure. FIG. 2 schematically illustrates a planar configuration of the wavelength conversion element 1A illustrated in FIG. 1. FIG. 1 illustrates a cross-sectional configuration taken along an I-I line illustrated in FIG. 2. This wavelength conversion element 1A is included, for example, in a light source module (light source module 100) of a projection display apparatus (projector 1000) described below (see FIGS. 32 to 38). The wavelength conversion element 1A has a configuration in which a phosphor layer 11 and a refrigerant transport member 12 are encapsulated in a housing 20 along with a refrigerant 13. The phosphor layer 11 and the refrigerant transport member 12 are stacked together. The phosphor layer 11 is directly cooled by the evaporative latent heat of the refrigerant 13.

1-1. Configuration of Wavelength Conversion Element

As described above, the wavelength conversion element 1A has a so-called two-phase cooling structure in which the phosphor layer 11 and the refrigerant transport member 12 are encapsulated in the housing 20 along with the refrigerant 13. The phosphor layer 11 is directly cooled by the evaporative latent heat of the refrigerant 13. The housing 20 includes, for example, a storage section 21 and cover glass 22. The cover glass 22 has light transmissivity and seals the internal space of the storage section 21 in combination with the storage section 21. There is provided a heat dissipation member 23 on the back surface of the storage section 21. The wavelength conversion element 1A according to the present embodiment further includes a protective layer 24. The protective layer 24 is provided on at least a portion of the inner wall of the housing 20. The inner wall defines the internal space in which the phosphor layer 11, the refrigerant transport member 12, and the refrigerant 13 are encapsulated.

The phosphor layer 11 includes a plurality of phosphor particles. It is preferable that the phosphor layer 11 be formed, for example, as an open-cell porous layer. Although described in detail below, it is preferable that the size (average pore size) of the pores be smaller than the average pore size of the refrigerant transport member 12 that is also formed as an open-cell porous layer. For example, an average pore size of 30 µm or less is preferable. It is preferable that the phosphor layer 11 be formed, for example, to have a plate shape or a cylindrical shape. The phosphor layer 11 includes, for example, so-called ceramic phosphors or binder-type porous phosphors.

Each of the phosphor particles is a particle-shaped phosphor that absorbs excitation light EL radiated from a light source section 110 described below to emit fluorescent light FL. For example, as a phosphor particle, a fluorescent material is used that is excited by blue laser light having a wavelength in the blue wavelength range (e.g., 400 nm to 470 nm) to emit yellow fluorescent light (light in a wavelength range between the red wavelength range and the green wavelength range). Examples of such a fluorescent substance include an YAG (yttrium/aluminum/garnet)-based material. For example, phosphor particles have an average particle size of 10 µm or more and 100 µm or less.

It is preferable that the phosphor layer 11 have a smaller diameter, for example, than that of the refrigerant transport member 12 and have a space (space 12S) between a side surface of the phosphor layer 11 and the side wall of the housing 20 (storage section 21). This efficiently circulates the refrigerant 13 in a cooling cycle of the wavelength conversion element 1A described below.

Figure 3:
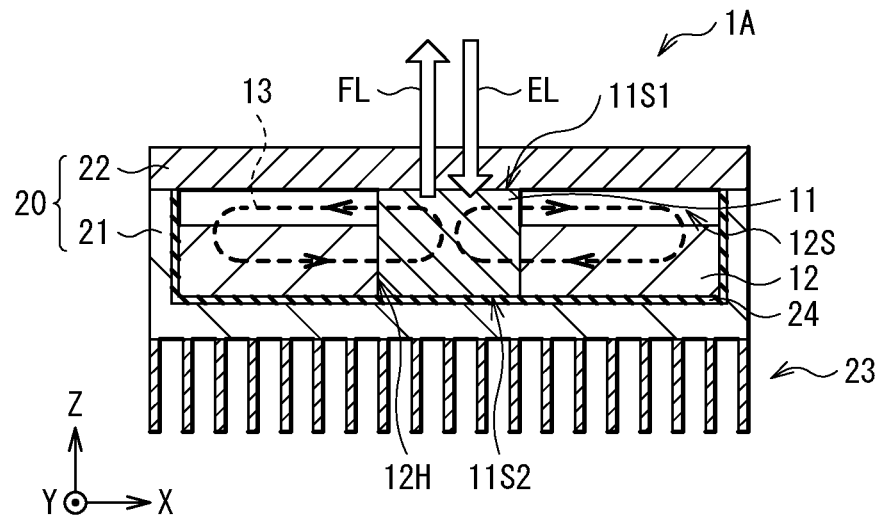
FIG. 3 is a cross-sectional schematic diagram illustrating another example of the configuration of the wavelength conversion element according to the first embodiment of the present disclosure.

Further, it is preferable that a portion of a surface 11S1 of the phosphor layer 11 corresponding to at least a light emitting section be in contact with or bonded to the cover glass 22 in the storage section 21. The surface 11S1 is disposed to be opposed to the cover glass 22. The light emitting section converts the excitation light EL into the fluorescent light FL. This makes it possible to prevent a droplet from adhering to a surface 22S of the cover glass 22 right opposed to the light emitting section and prevent the excitation light EL and the fluorescent light FL from being scattered by the droplet. It is to be noted that FIG. 1 illustrates the example in which the phosphor layer 11 is stacked on the refrigerant transport member 12, but this is not limitative. For example, as illustrated in FIG. 3, there may be provided an opening 12H, for example, to the refrigerant transport member 12 and the phosphor layer 11 may be inserted to the opening 12H. The opening 12H has substantially the same diameter as the outer diameter of the phosphor layer 11. In that case, a surface 11S2 of the phosphor layer 11 opposed to the bottom surface of the storage section 21 may be in contact with or bonded to the storage section 21 (specifically, the protective layer 24) as with the surface 11S1.

The refrigerant transport member 12 is for carrying the refrigerant 13 to the phosphor layer 11. It is preferable that the refrigerant transport member 12 be formed as an open-cell porous layer as with the phosphor layer 11. It is preferable that the average pore size of the refrigerant transport member 12 be greater than the average pore size of the phosphor layer 11.

The wavelength conversion element 1A according to the present embodiment is a so-called reflective wavelength conversion element that extracts the fluorescent light FL by reflecting the fluorescent light FL, for example, in the same direction as the direction in which the excitation light EL is inputted. The fluorescent light FL is emitted from the phosphor layer 11 irradiated with the excitation light EL. It is therefore preferable that the refrigerant transport member 12 further have light reflectivity. For example, the use of an inorganic material such as a metal material or a ceramic material is preferable. Examples of a material included in the refrigerant transport member 12 include a single metal such as aluminum (Al), copper (Cu), molybdenum (Mo), tungsten (W), cobalt (Co), chromium (Cr), platinum (Pt), tantalum (Ta), lithium (Li), zirconium (Zr), ruthenium (Ru), rhodium (Rh), or palladium (Pd) or an alloy including one or more of these. The refrigerant transport member 12 includes a sintered ceramic compact, a sintered metal, or a porous metal including, for example, the material described above.

For example, as illustrated in FIG. 1, the refrigerant 13 circulates between the phosphor layer 11 and the refrigerant transport member 12 to cool the phosphor particles heated by being irradiated with the excitation light EL. For example, it is preferable that a liquid having great latent heat be used for the refrigerant 13. In addition, the refrigerant 13 circulates through gaps formed in the phosphor layer 11 and the refrigerant transport member 12. It is therefore preferable that the refrigerant 13 have low viscosity. Specific examples of the refrigerant 13 include water, acetone, methanol, naphthalin, benzene, and the like.

One surface of the housing 20 includes a material having light transmissivity. It is possible to form a sealed space (internal space) in the housing 20. As described above, the housing 20 includes the storage section 21 and the cover glass 22 that forms a sealed space in combination with the storage section 21 and corresponds to the one surface described above. This cover glass 22 corresponds to a specific example of a "sealing section" according to the present disclosure. The storage section 21 stores the phosphor layer 11, the refrigerant transport member 12, and the refrigerant 13. The phosphor layer 11 and the refrigerant transport member 12 are disposed to cause the phosphor layer 11 to be opposed to the cover glass 22 side, for example, in FIG. 1, but this is not limitative. As a material included in the housing 20, for example, aluminum, copper, stainless steel, low-carbon steel, an alloy material thereof, and the like are used for the storage section 21. In addition to a glass substrate, for example, soda glass, quartz, sapphire glass, crystal, and the like are used for the cover glass 22. In addition, in a case where the light source section 110 outputs laser light with low output power, resins and the like are used such as polyethylene terephthalate (PET), a silicone resin, polycarbonate, and acryl.

The opposite surface of the housing 20 to the one surface or the back surface of the storage section 21 is provided with the heat dissipation member 23. The heat dissipation member 23 is for cooling the storage section 21. This condenses the vapor of the refrigerant 13 on the inner surface side of the storage section 21 to bring about a phase change into liquid and the liquid is transported to the phosphor layer 11 by the refrigerant transport member 12. It is possible to use, for example, a plurality of heat dissipation fins as the heat dissipation member 23 as illustrated in FIG. 1, but this is not limitative. For example, a Peltier element or a water cooling element may be used, for example, as the heat dissipation member 23.

The protective layer 24 is formed on at least a portion of the inner wall that defines the internal space of the housing 20. The protective layer 24 is for preventing the housing 20 and the refrigerant 13 from coming into contact. It is preferable, for example, that the protective layer 24 be formed on the whole of the inner wall of the storage section 21. This prevents a foreign object from dissolving in the refrigerant 13 from the storage section 21 (e.g., the elution of metal ions derived from the metal included in the storage section 21) and prevents the metal included in the storage section 21 from corroding.

The use of a material having a high affinity with the refrigerant 13 is preferable for the protective layer 24. For example, in a case where water is used as the refrigerant 13, a material of the protective layer 24 includes an oxide such as silicon oxide ($SiO_2$), aluminum oxide ($Al_2O_3$), and titanium oxide ($TiO_2$) having high hydrophilicity. In addition, a metal material that has, for example, a standard electrode potential of more than 0.35 V and rusts less easily may be used such as gold (Au), silver (Ag), or stainless steel. In that case, it is preferable, for example, to perform plasma processing on the surface and provide the surface of the metal film with hydroxyl groups. This increases the affinity with the refrigerant 13 (e.g., water). Alternatively, the oxide film described above may be formed on the surface of the metal film described above. Examples of metal materials other than the above include zinc (Zn), nickel (Ni), and chromium (Cr) or an alloy including them. The protective layer 24 may be a single layer film or a stacked film. In a case where the protective layer 24 is formed as a stacked film, it is preferable, for example, to form the oxide film described above on the outermost layer. It is possible to form the protective layer 24, for example, by vapor deposition, film formation by a sputtering device, coating such as spin coating, plating, or mechanical bonding.

It is to be noted that providing the protective layer 24 with a minute (e.g., several m to several mm) concave and convex structure on the surface also makes it possible to increase the affinity with the refrigerant 13. Providing the surface of the protective layer 24 with a concave and convex structure facilitates the refrigerant 13 to enter the surface of the protective layer 24 by capillary force as with the refrigerant transport member 12 described above and increases the affinity (wettability). In addition, the protective layer 24 may be provided with an optical reflection function, an optical anti-reflection function, a color separation function, a polarization separation function, an optical phase adjustment function, a high thermal conduction function, and the like in addition to a function of protecting the surface of the storage section 21.

As described above, the wavelength conversion element 1A according to the present embodiment has a two-phase cooling structure in which the stacked phosphor layer 11 and refrigerant transport member 12 are encapsulated in the housing 20 along with the refrigerant 13. The housing 20 has a sealed internal space. The phosphor layer 11 is directly cooled by the evaporative latent heat of the refrigerant 13. To circulate the refrigerant 13 from the refrigerant transport member 12 to the phosphor layer 11, it is desirable that the capillary force generated in the phosphor layer be greater than the capillary force generated in the refrigerant transport member 12. The capillary force is expressed by the following expression.

(Expression 1)

$$P = 2T \cos \theta / \mu g r \quad (1)$$

(P represents capillary force, T represents surface tension, θ represents a contact angle, p represents the density of liquid, g represents gravitational acceleration, and r represents a capillary radius)

The equivalent capillary radius of the refrigerant transport member 12 is proportional to the average pore size. To cause the phosphor layer 11 to have capillary force greater than the capillary force of the refrigerant transport member 12, it is desirable from the expression (1) described above that the average pore size of the refrigerant transport member 12 be greater than the average pore size of the phosphor layer 11. In addition, as indicated by the expression (1), one of the phosphor layer 11 and the refrigerant transport member 12 that has a smaller contact angle has greater capillary force. It is therefore desirable that materials included in the phosphor layer 11 and the refrigerant transport member 12 each have wettability.

It is to be noted that, in a case where the wavelength conversion element 1A according to the present embodiment stands upright for use, the capillary force of the refrigerant transport member 12 has to draw up the refrigerant 13 to the irradiated position (light emitting section) with the excitation light EL against gravity. Accordingly, in a case where $R_0$ represents the distance from the light emitting section to the outermost periphery (the inner side surface of the storage section 21), it is desirable that capillary force P of the refrigerant transport member 12 satisfy P≥hydraulic head difference $R_0$ (mmH$_2$O). This does not, however, apply in a case where a wavelength conversion element is rotated for use as with a wavelength conversion element 1D described below.

Figure 4:
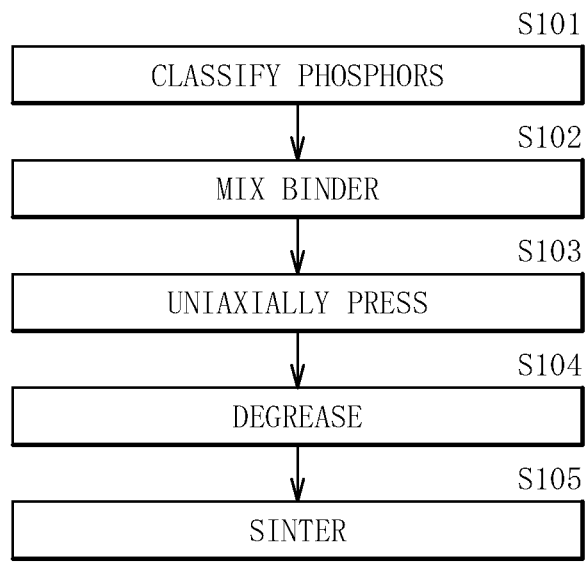
FIG. 4 is a flowchart of steps of manufacturing a phosphor layer.

In a case where the phosphor layer 11 and the refrigerant transport member 12 are each formed by using a sintered compact, control over predetermined parameters in the manufacturing steps of each of the sintered compacts offers a desired average pore size. The following gives description by using a sintered phosphor as an example. FIG. 4 is a flowchart of steps of manufacturing a sintered phosphor. First, phosphors are classified to control the particle size of the phosphor particles (step S101). The phosphor particles and a binder are then mixed together (step S102). Next, the pressing pressure is controlled to perform uniaxial press (step S103). Subsequently, degreasing is performed (step S104) and sintering is then performed (step S105). As described above, the phosphor layer 11 including sintered phosphors is formed. It is possible to adjust the average pore size of the sintered phosphors at a desired value by classifying phosphors in step S101, controlling the pressing pressure for uniaxial press in step S103, and controlling the sintering temperature in step S105.

The cooling cycle of the wavelength conversion element 1A according to the present embodiment is described. First, in a case where the phosphor layer 11 is irradiated with the excitation light EL, the phosphor particles generate heat. The refrigerant 13 is evaporated by that heat and concurrently takes the latent heat away. In a case where the middle portion of the phosphor layer 11 is irradiated with the excitation light EL as illustrated in FIG. 1, the evaporated refrigerant 13 moves to the space 12S on the outer peripheral side of the phosphor layer 11 as vapor. The vapor that has moved to the space 12S dissipates the latent heat through the inner wall of the storage section 21 and is liquidized again. The liquidized refrigerant 13 is transported to the phosphor layer 11 by the capillary force of the refrigerant transport member 12 and moved to the heated section of the phosphor layer 11 by the capillary force of the phosphor layer 11. The heat generated through the radiation of the excitation light EL is discharged to the refrigerant transport member 12 by repeating this.

1-2. Workings and Effects

In recent years, laser excitation phosphors have been used as light sources in projection display apparatuses (projectors). The laser excitation phosphor light sources have an issue with an increase in the cooling efficiency of phosphors. The two-phase flow cooling technology (phase change cooling technology) that uses latent heat has attracted attention. This two-phase flow cooling technology allows a refrigerant to directly cool a light emitting particle of a phosphor or a light emitting region.

Figure 5:
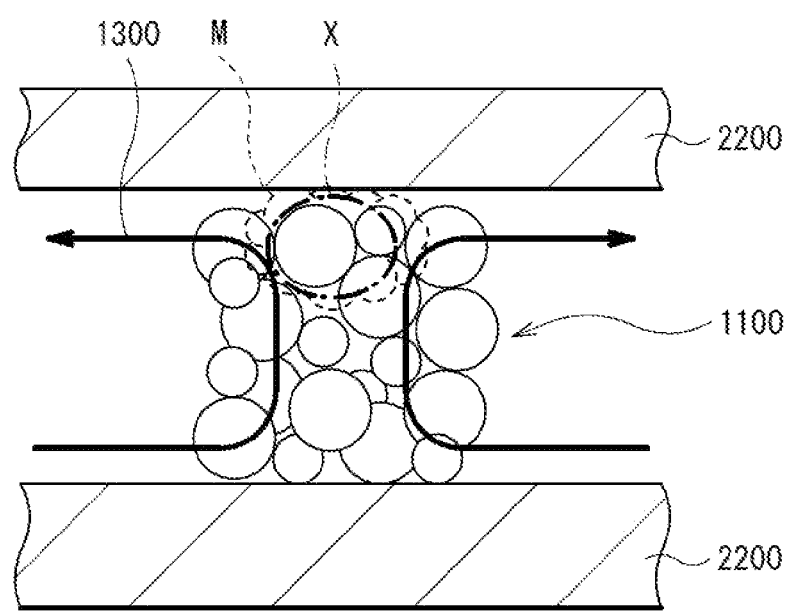
FIG. 5 is an enlarged schematic diagram of a main portion of a wavelength conversion element serving as a reference example.

However, in a case where a metal material is used for a sealed housing that encapsulates a phosphor and a refrigerant, metal ions elute in the refrigerant or the metal included in the sealed housing corrodes. The metal ions eluted in the refrigerant move to a light emitting section X of a phosphor layer 1100 along with a refrigerant 1300, for example, as illustrated in FIG. 5. The refrigerant 1300 vaporizes and evaporates while taking away the heat generated in a case where fluorescent light is emitted. In that case, metal ions included in the refrigerant 1300, however, remain on the surfaces of the phosphor particles in the light emitting section X and the region near the light emitting section X. These continue, causing deposits M of the metal ions to adhere to the surfaces of the phosphor particles in the light emitting section X and the region near the light emitting section X. The deposits M absorb and scatter excitation light or fluorescent light. As a result, the laser excitation phosphor light sources have less light output power.

Possible countermeasures against metal deposition include a method of suppressing a change in nature by including metal having a non-conductor coating formed on the surface in a sealed housing or oxidizing the surface of a housing in advance. It is, however, difficult to prevent the elution of metal ions or corrosion with substantially no influence on light output power in an environment in which the refrigerant continuously stays in contact for a long period of time and the refrigerant changes in temperature.

In contrast, in the present embodiment, the protective layer 24 is provided on the inner wall of the storage section 21 that defines the internal space of the housing 20 and the refrigerant 13 and the storage section 21 are prevented from coming into contact. This prevents metal ions from eluting in the refrigerant 13 and prevents the metal included in the storage section 21 from corroding.

As described above, the wavelength conversion element 1A according to the present embodiment is provided with the protective layer 24 on the inner wall of the storage section 21 that defines the internal space. This makes it possible to prevent metal ions from eluting in the refrigerant 13 from the storage section 21, prevent the storage section 21 from corroding, and prevent the deposits of metal ions from adhering especially to the light emitting region of the phosphor layer 11. It is thus possible to achieve a wavelength conversion element having high output power and high reliability.

In addition, the wavelength conversion element 1A according to the present embodiment uses two-phase cooling. This keeps the phosphor layer 11 at constant temperature. This makes it possible in the light source module including this wavelength conversion element 1A to stabilize the light source output power and allows a projector including this to have higher image quality.

Further, it is possible in the present embodiment to achieve a non-rotary wavelength conversion element that has highly efficient cooling performance and allows for stable use. This makes it possible to miniaturize the light source module and the projector. Still further, there is less concern about image quality deterioration caused by rotation flicker as compared with the use of a rotary wavelength conversion element. It is therefore possible to further stabilize the light source output power. In addition, it is also possible to further increase the image quality of the projector including this.

Next, a second embodiment, modification examples 1 to 13, and an application example are described. The following assigns the same signs to components similar to those of the first embodiment described above and omits descriptions thereof as appropriate.

2. Modification Examples 2-1. Modification Example 1

Figure 6:
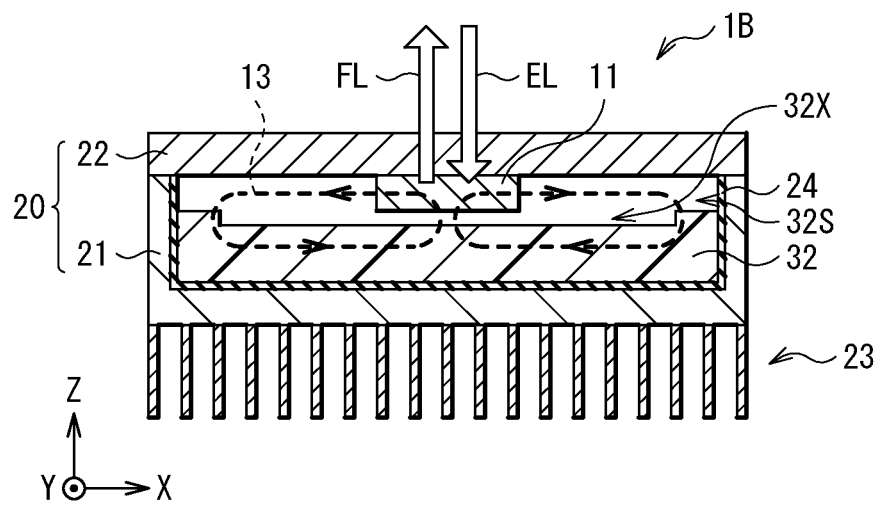
FIG. 6 is a cross-sectional schematic diagram illustrating an example of a configuration of a wavelength conversion element according to a modification example 1 of the present disclosure.
Figure 7:
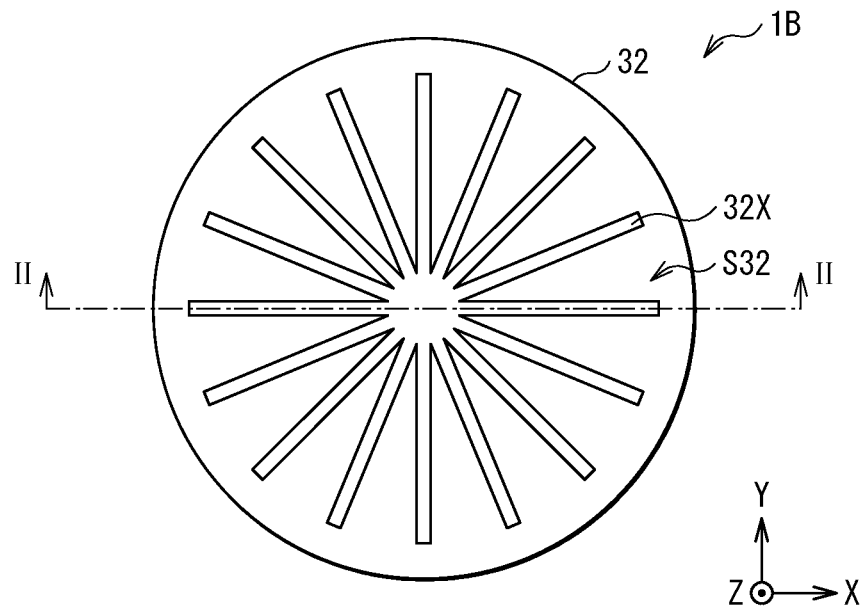
FIG. 7 is a plane schematic diagram of a refrigerant transport member illustrated in FIG. 6.

FIG. 6 schematically illustrates an example of a cross-sectional configuration of a wavelength conversion element (wavelength conversion element 1B) according to a modification example 1 of the present disclosure. FIG. 7 schematically illustrates an example of a planar configuration of a refrigerant transport member 32 illustrated in FIG. 6. It is to be noted that the cross section of the refrigerant transport member 32 in FIG. 6 is taken along an II-II line illustrated in FIG. 7. As with the first embodiment described above, this wavelength conversion element 1B is included in the light source module (light source module 100) of the projection display apparatus (projector 1000). The wavelength conversion element 1B according to the present modification example encapsulates the stacked phosphor layer 11 and refrigerant transport member 32 in the housing 20 along with the refrigerant 13 and is different from the first embodiment described above in that the refrigerant transport member 32 includes a metal plate having minute flow paths 32X formed on the contact surface with the phosphor layer 11.

The refrigerant transport member 32 is for carrying the refrigerant 13 to the phosphor layer 11. As described above, the refrigerant transport member 32 has the minute flow paths 32X formed on the contact surface with the phosphor layer 11. Grooves are formed through micromachining on a surface S1 (contact surface with the phosphor layer 11) of the refrigerant transport member 32 as the flow paths 32X. The grooves radially extend from the middle to the outer periphery of the refrigerant transport member 32, for example, as illustrated in FIG. 7. Each of these flow paths 32X is formed, for example, to have both a width and a depth of several tens of m to several hundreds of m. This generates capillary force. It is to be noted that the flow paths 32X are formed to cause the refrigerant transport member 32 to have less capillary force than the capillary force of the phosphor layer 11 as with the first embodiment described above. In addition, FIG. 7 illustrates the example of the flow paths 32X radially extending from the middle to the outer periphery of the refrigerant transport member 32, but this is not limitative. For example, the flow paths 32X may be formed to have a lattice shape or a spiral shape.

It is preferable that a material having high wettability and hydrophilicity be used for a metal plate included in the refrigerant transport member 32. In addition, in a case where use as a light reflecting layer is taken into consideration, for example, the use of an aluminum (Al) substrate is preferable. In addition, it is possible to use a substrate such as a copper (Cu) substrate including an inorganic material mentioned as the above-described material included in the refrigerant transport member 12, but it is preferable in this case that a high-reflective film be formed on the surface.

Figure 8:
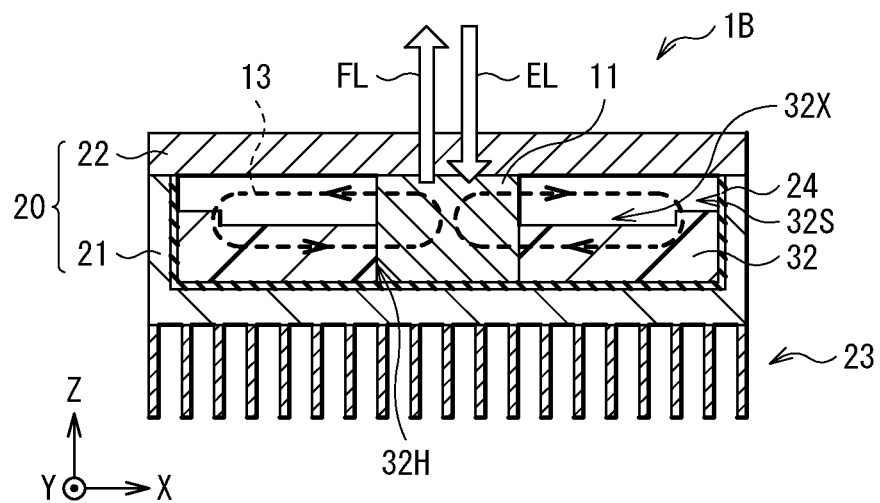
FIG. 8 is a cross-sectional schematic diagram illustrating another example of the configuration of the wavelength conversion element according to the modification example 1 of the present disclosure.
Figure 9:
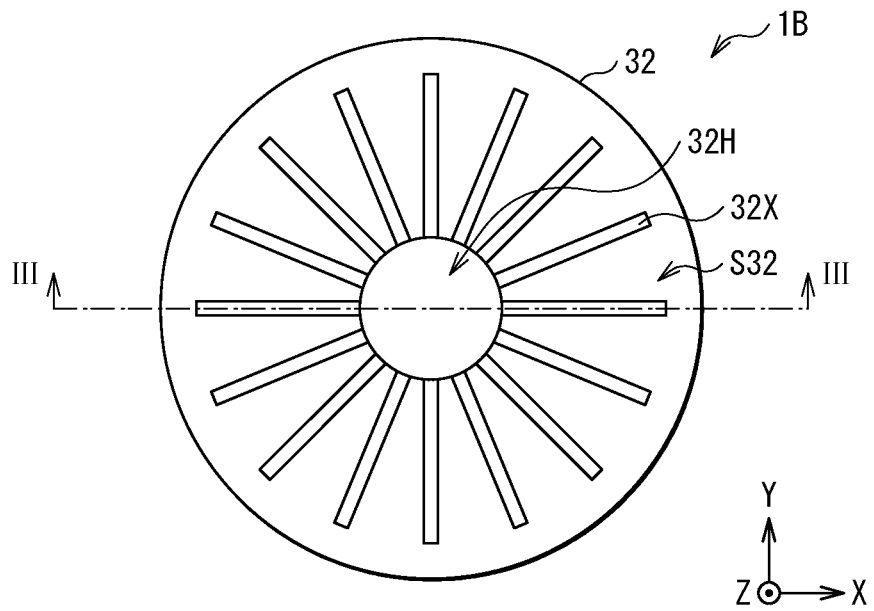
FIG. 9 is a plane schematic diagram of a refrigerant transport member illustrated in FIG. 8.

In addition, FIG. 6 illustrates the example in which the phosphor layer 11 is stacked on the refrigerant transport member 12 in the storage section 21, but this is not limitative. FIG. 8 schematically illustrates an example of a cross-sectional configuration of the wavelength conversion element 1B according to the modification example 1 of the present disclosure. FIG. 9 schematically illustrates another example of the planar configuration of the refrigerant transport member 32 illustrated in FIG. 8. It is to be noted that the cross section of the refrigerant transport member 32 in FIG. 8 is taken along III-III illustrated in FIG. 9. For example, as with the wavelength conversion element 1A illustrated in FIG. 3 described above, the wavelength conversion element 1B according to the present modification example may be provided with an opening 32H on the refrigerant transport member 32 and the phosphor layer 11 may be inserted to the opening 12H. The opening 32H has substantially the same diameter as the outer diameter of the phosphor layer 11.

As described above, in the present modification example, the use of a metal plate including the flow paths 32X each having a predetermined size on the contact surface with the phosphor layer 11 as the refrigerant transport member 32 also makes it possible to obtain an effect similar to that of the first embodiment described above.

It is to be noted that the flow paths 32X may also be formed directly on the storage section 21. In that case, it is possible to omit the refrigerant transport member 32. This makes it possible to reduce members included in the wavelength conversion element 1B and miniaturize (thin down) the wavelength conversion element 1B.

2-2. Modification Example 2

Figure 10:
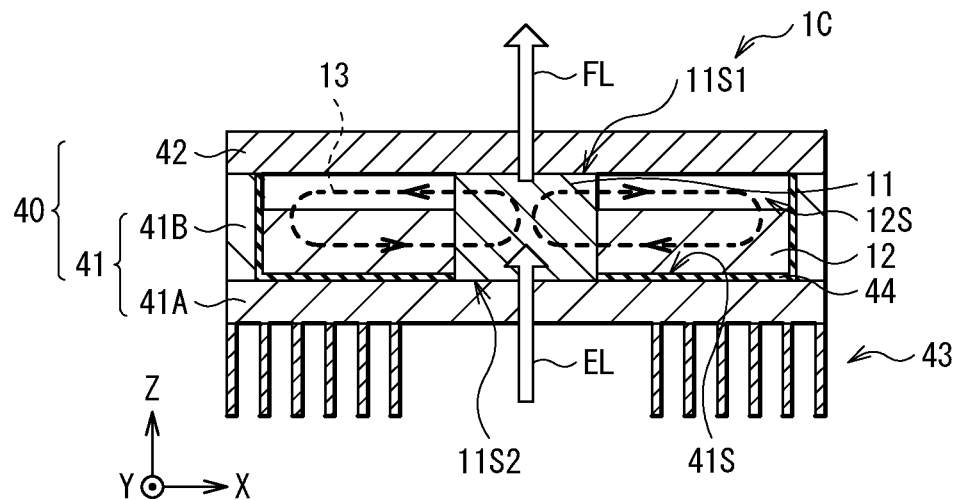
FIG. 10 is a cross-sectional schematic diagram illustrating an example of a configuration of a wavelength conversion element according to a modification example 2 of the present disclosure.

FIG. 10 schematically illustrates a cross-sectional configuration of a wavelength conversion element (wavelength conversion element 1C) according to a modification example 2 of the present disclosure. As with the first embodiment described above, this wavelength conversion element 1C is included in the light source module (light source module 100) of the projection display apparatus (projector 1000). The wavelength conversion element 1C according to the present modification example is a so-called transmissive wavelength conversion element in which the fluorescent light FL emitted from the phosphor layer 11 passes through the phosphor layer 11 and is extracted from the opposite surface to the surface irradiated with the excitation light EL.

In the present modification example, the refrigerant transport member 12 is provided with the opening 12H at the position corresponding to the light emitting section (the irradiated position with the excitation light EL) of the phosphor layer 11. The phosphor layer 11 is inserted to the opening 12H, for example, as with the wavelength conversion element 1A illustrated in FIG. 3. The surface (e.g., surface 11S2) of the phosphor layer 11 to which the excitation light EL is inputted and the surface (e.g., surface 11S1) of the phosphor layer 11 from which the fluorescent light FL is outputted are respectively in contact with or bonded to the storage section 21 and the cover glass 22. A housing 40 includes a rear cover 41A, a side wall 41B, and cover glass 42. The rear cover 41A and the cover glass 42 each include a material having light transmissivity. The side wall 41B may be formed by using the above-described material mentioned for the storage section 21 or may be formed by using a material similar to those of the cover glass 42 and the rear cover 41A. This converts, for example, the excitation light EL radiated from the rear cover 41A side into the fluorescent light FL in the phosphor layer 11 and the fluorescent light FL is extracted from the cover glass 42 side. There is provided a heat dissipation member 43 in a region in which the heat dissipation member 43 does not prevent the excitation light EL from being radiated, for example, as illustrated in FIG. 10.

It is preferable to form a protective layer 44, for example, at least inside the side wall 41B of a storage section 41 that defines the internal space of the housing 40. The protective layer 44 may also be further formed on a surface 41S of the rear cover 41A included in the bottom surface of the internal space as illustrated in FIG. 10. In that case, it is preferable to form the protective layer 44 except for the area that abuts, for example, the phosphor layer 11 not to prevent the excitation light EL from being inputted. This does not, however apply in a case where the protective layer 44 has transmissivity to the excitation light EL and the fluorescent light FL. It is possible to form the protective layer 44 on the whole of the surface 41S of the rear cover 41A.

As described above, in the present modification example, the rear cover 41A having light transmissivity is used for the bottom surface of the storage section 41. This makes it possible to configure the transmissive wavelength conversion element 1C that has an effect similar to that of the first embodiment described above.

2-3. Modification Example 3

Figure 11:
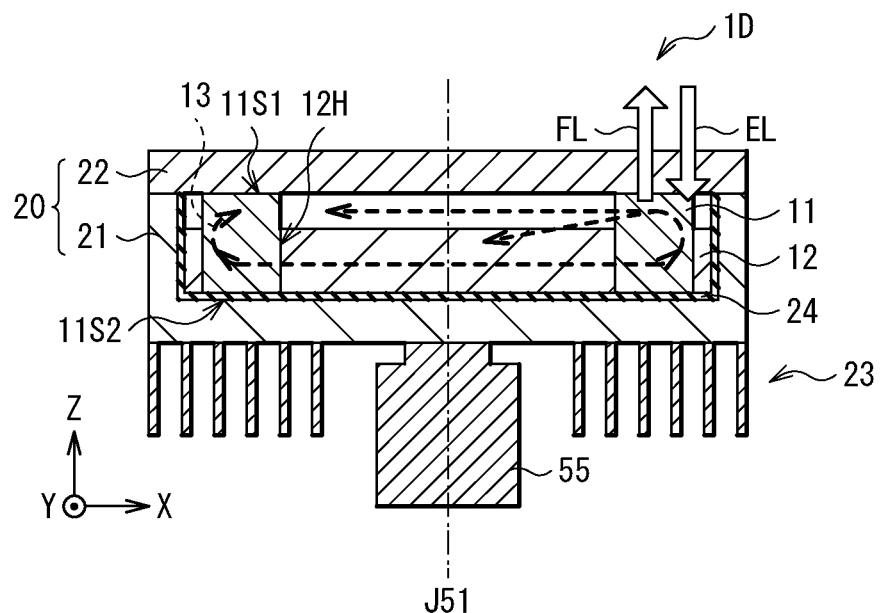
FIG. 11 is a cross-sectional schematic diagram illustrating an example of a configuration of a wavelength conversion element according to a modification example 3 of the present disclosure.
Figure 12:
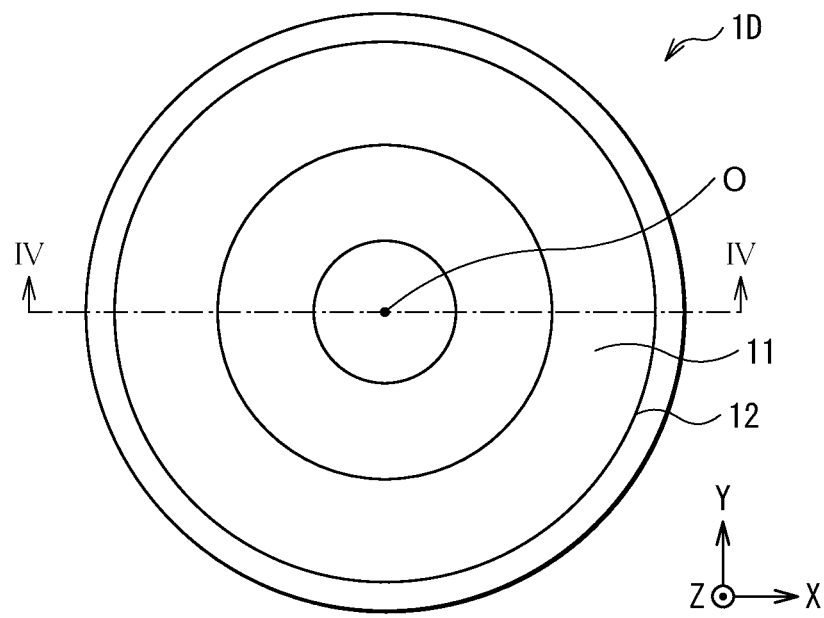
FIG. 12 is a plane schematic diagram of the wavelength conversion element illustrated in FIG. 11.

FIG. 11 schematically illustrates an example of a cross-sectional configuration of a wavelength conversion element (wavelength conversion element 1D) according to a modification example 3 of the present disclosure. FIG. 12 schematically illustrates a planar configuration of the wavelength conversion element 1D illustrated in FIG. 11. FIG. 11 illustrates a cross-sectional configuration taken along an IV-IV line illustrated in FIG. 12. As with the first embodiment or the like described above, this wavelength conversion element 1D is included in the light source module (light source module 100) of the projection display apparatus (projector 1000). The wavelength conversion element 1D according to the present modification example is a so-called reflective phosphor wheel that is rotatable around a rotation axis (e.g., axis J51).

In the present modification example, the phosphor layer 11 is continuously formed in the rotating circumferential direction of the refrigerant transport member 12 having a circular shape, for example, as illustrated in FIG. 12. In other words, a phosphor layer 61 is formed, for example, to have an annular shape.

The protective layer 24 is formed on the inner wall of the storage section 21 that defines the internal space of the housing 20 as in the first embodiment described above. The opening 12H having substantially the same shape as that of the phosphor layer 11 having an annular shape is provided on the refrigerant transport member 12. The phosphor layer 11 is inserted to the opening 12H. The surface 11S1 opposed to the cover glass 22 of the phosphor layer 11 and the surface 11S2 opposed to the bottom surface of the storage section 21 are respectively in contact with or bonded to the cover glass 22 and the storage section 21.

The housing 20 according to the present modification example is a wheel member. For example, a motor 55 is attached to the housing 20. The motor 55 is for rotating and driving the wavelength conversion element 1D at predetermined rotation speed. The motor 55 drives the wavelength conversion element 1D to rotate the phosphor layer 61 in the plane orthogonal to the radiation direction of the excitation light EL emitted from the light source section 110. This temporally changes (moves) the irradiated position of the wavelength conversion element 1D with the excitation light EL in the plane orthogonal to the radiation direction of the excitation light at the speed corresponding to the rotation speed.

2-4. Modification Example 4

Figure 13:
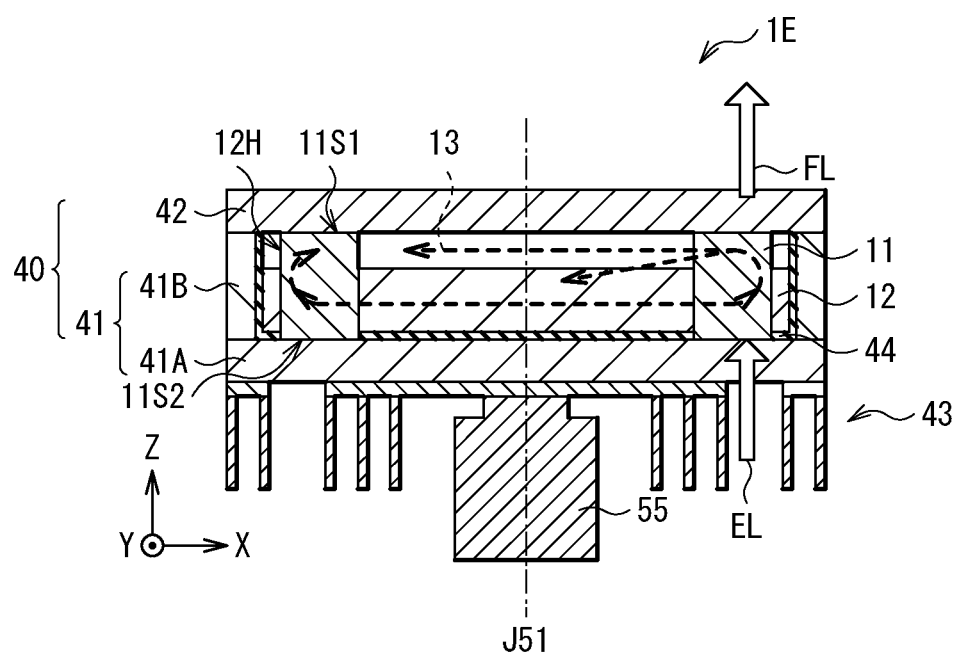
FIG. 13 is a cross-sectional schematic diagram illustrating an example of a configuration of a wavelength conversion element according to a modification example 4 of the present disclosure.

FIG. 13 schematically illustrates an example of a cross-sectional configuration of a wavelength conversion element (wavelength conversion element 1E) according to a modification example 4 of the present disclosure. As with the first embodiment or the like described above, this wavelength conversion element 1E is included in the light source module (light source module 100) of the projection display apparatus (projector 1000). The wavelength conversion element 1E according to the present modification example is a so-called transmissive phosphor wheel that is rotatable around a rotation axis (e.g., axis J51).

In the present modification example, the housing 40 includes the rear cover 41A, the side wall 41B, and the cover glass 42 as in the modification example 2 described above.

The rear cover 41A and the cover glass 42 each include a material having light transmissivity. In addition, the protective layer 44 is also formed, for example, inside the side wall 41B that defines the internal space of the storage section 41 as in the modification example 2 described above. Further, the protective layer 44 is formed except for the area of the surface 41S of the rear cover 41A that abuts, for example, the phosphor layer 11. The surface 41S is included in the bottom surface of the internal space. As described above, this does not, however apply in a case where the protective layer 44 has transmissivity to the excitation light EL and the fluorescent light FL. It is possible to form the protective layer 44 on the whole of the surface 41S of the rear cover 41A.

As described above, the present technology is also applicable to a rotary wavelength conversion element. It is possible to prevent the deposit of metal ions from adhering to the light emitting section of the phosphor layer 11 and the region near the light emitting section and increase the output power and the reliability. In addition, in a rotary wavelength conversion element, centrifugal force also contributes to the circulation of the refrigerant 13 in addition to the capillary force described above. It is therefore possible for the rotary wavelength conversion elements 1D and 1E described above to obtain higher cooling performance than that of a non-rotary wavelength conversion element (e.g., the wavelength conversion elements 1A to 1C described above).

2-5. Modification Example 5

Figure 14:
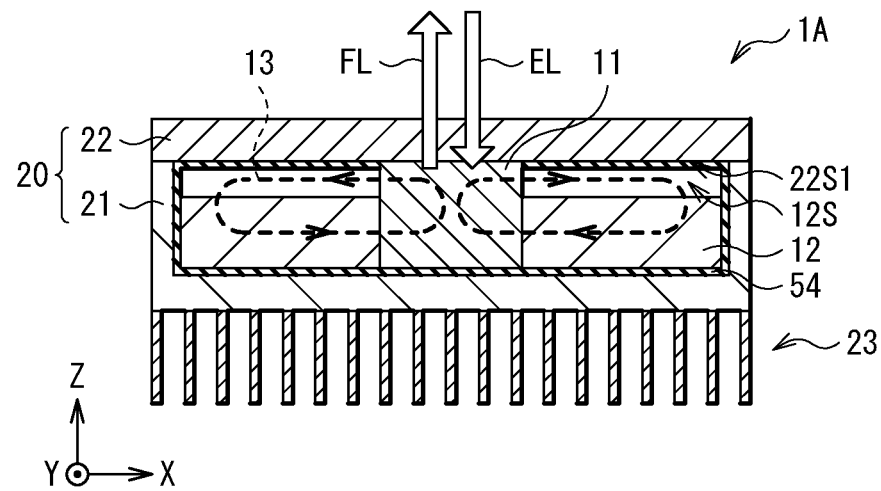
FIG. 14 is a cross-sectional schematic diagram illustrating an example of a configuration of a wavelength conversion element according to a modification example 5 of the present disclosure.

FIG. 14 schematically illustrates another example of a cross-sectional configuration of the wavelength conversion element 1A serving as a modification example of the first embodiment described above. The example has been described in the first embodiment described above in which the protective layer 24 is provided on the inner wall of the storage section 21, but this is not limitative. The present modification example is different from the first embodiment described above in that a protective layer 54 is also formed on a surface 22S1 of the cover glass 22 in addition to the inner wall of the storage section 21. The surface 22S1 of the cover glass 22 defines the internal space along with the storage section 21.

The protective layer 54 is provided on the whole of the inner walls of the storage section 21 and the cover glass 22 that define the internal space of the housing 20 as described above. It is, however, preferable to form the protective layer 54 on the surface 22S1 of the cover glass 22 except for the area that abuts, for example, the phosphor layer 11 not to prevent the excitation light EL from being inputted and not to prevent the fluorescent light FL from being outputted. This does not, however apply in a case where the protective layer 44 has transmissivity to the excitation light EL and the fluorescent light FL. It is possible to form the protective layer 44 on the whole of the surface 41S of the rear cover 41A. It is possible to form the protective layer 54 by using, for example, the materials mentioned in the first embodiment described above. It is, however, preferable to use a light shielding metal material among the materials described above for the protective layer 54 that is formed on the surface 22S1 of the cover glass 22. This attains an effect of making it possible to suppress stray light in addition to the effect according to the first embodiment described above.

Figure 15:
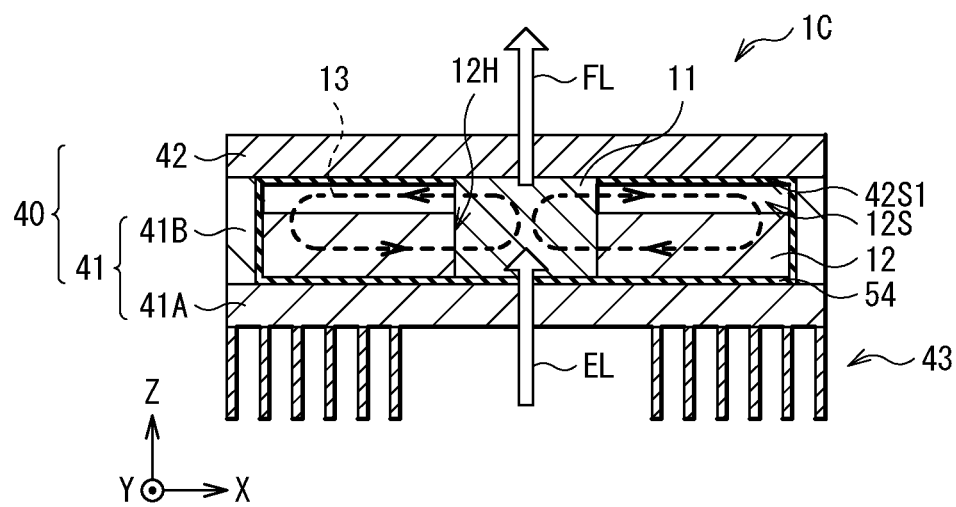
FIG. 15 is a cross-sectional schematic diagram illustrating another example of the configuration of the wavelength conversion element according to the modification example 5 of the present disclosure.
Figure 16:
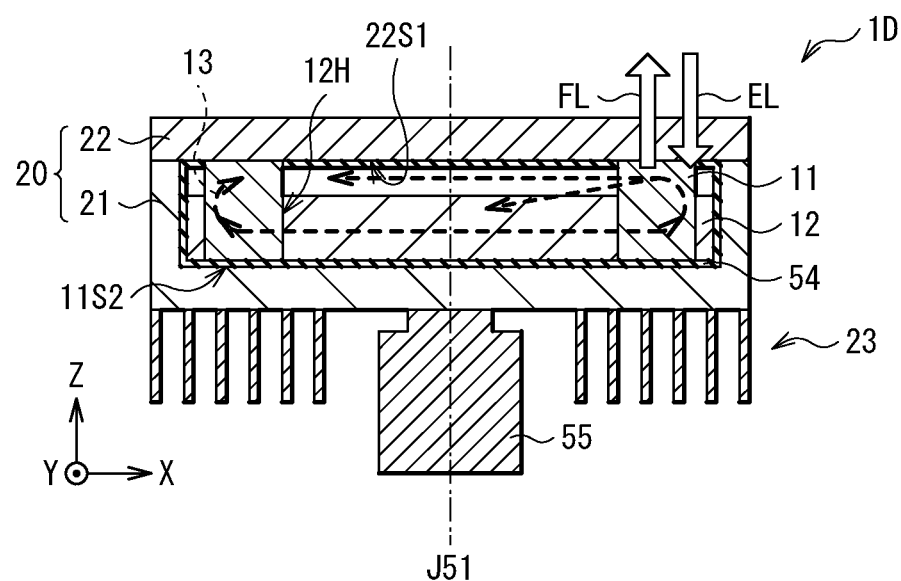
FIG. 16 is a cross-sectional schematic diagram illustrating another example of the configuration of the wavelength conversion element according to the modification example 5 of the present disclosure.
Figure 17:
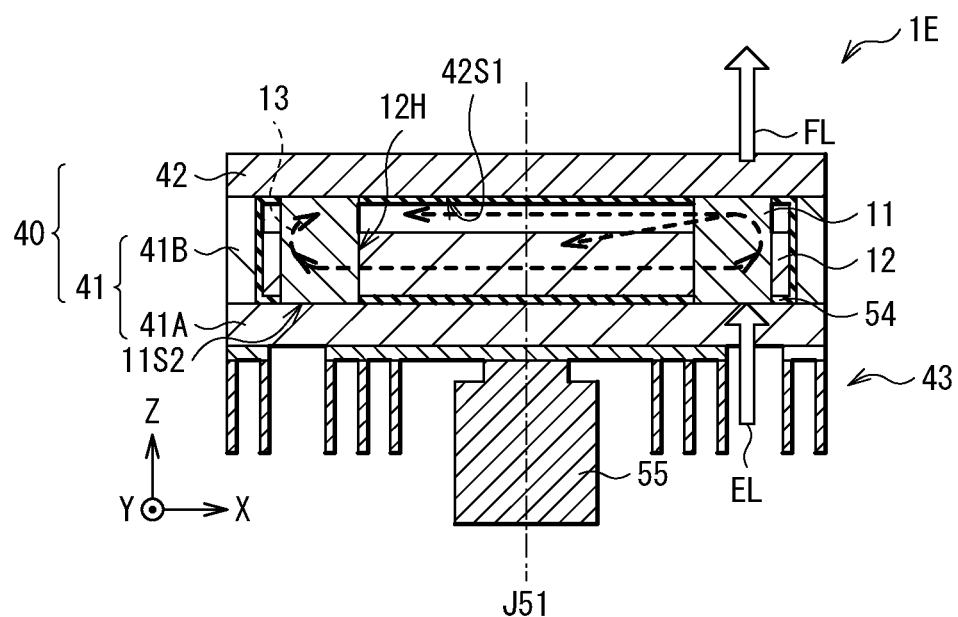
FIG. 17 is a cross-sectional schematic diagram illustrating another example of the configuration of the wavelength conversion element according to the modification example 5 of the present disclosure.

It is to be noted that the configuration according to the present modification example is also applicable to the wavelength conversion elements 1B to 1E described in the modification examples 1 to 4 described above. FIGS. 15 to 17 schematically illustrate other examples of cross-sectional configurations of the wavelength conversion elements 1B to 1E according to combinations of the configuration according to the present modification example with the respective modification examples 1 to 4 described above. As described above, providing the surface 22S1 of the cover glass 22 (or a surface 42S1 of the cover glass 42) with the light shielding protective layer 54 makes it possible to obtain an effect of allowing stray light to be suppressed in addition to the effects according to the modification examples 1 to 4 described above.

2-6. Modification Example 6

The example has been described in the first embodiment or the like described above in which the refrigerant transport member (e.g., refrigerant transport member 12) includes a sintered ceramic compact, a sintered metal, or a porous metal, but the refrigerant transport member may include, for example, the following materials.

Figure 18:
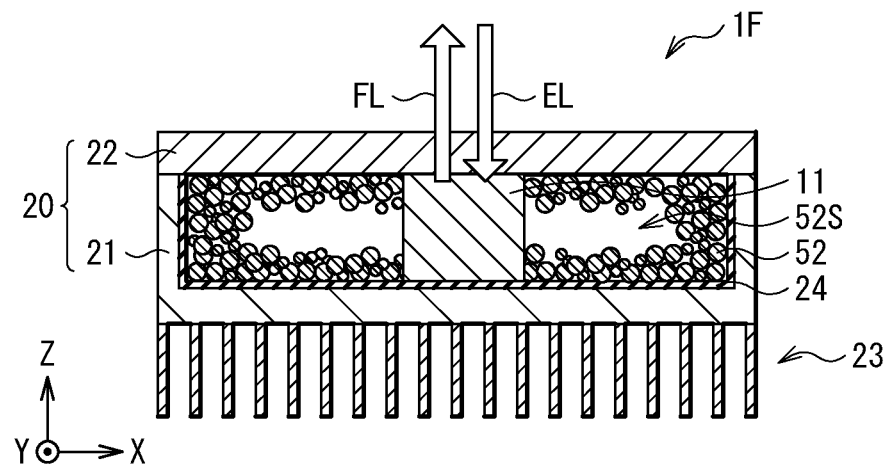
FIG. 18 is a cross-sectional schematic diagram illustrating an example of a configuration of a wavelength conversion element according to a modification example 6 of the present disclosure.
Figure 19:
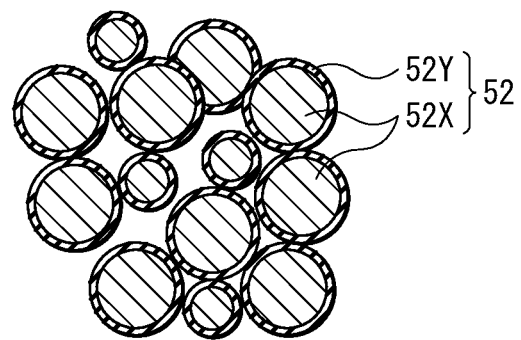
FIG. 19 is an enlarged cross-sectional schematic diagram of a main portion of the wavelength conversion element illustrated in FIG. 18.

FIG. 18 schematically illustrates an example of a cross-sectional configuration of a wavelength conversion element (wavelength conversion element 1F) according to a modification example 6 of the present disclosure. FIG. 19 is an enlarged view of a configuration of a refrigerant transport member 52 illustrated in FIG. 18. The wavelength conversion element 1F is a reflective wavelength conversion element. The refrigerant transport member 52 includes a plurality of particles 52X each having, for example, light reflectivity. Examples of the particles 52X each having light reflectivity include barium sulfate ($BaSO_4$), titanium oxide ($TiO_2$), alumina ($Al_2O_3$), and the like. It is preferable that the surfaces of the plurality of particles 52X included in the refrigerant transport member 52 be covered with a protective layer 52Y similar to the protective layer 24 provided, for example, on the inner wall of the housing 20. This makes it possible to prevent metal ions from eluting in the refrigerant 13 (not illustrated in FIG. 18) from the plurality of particles 52X and prevent the plurality of particles 52X from corroding due to the refrigerant 13.

In the wavelength conversion element 1F according to the present modification example, the refrigerant transport member 52 locally have the plurality of particles 52X in contact with the wall surface of the internal space of the housing 20. There is provided a space 52S at the middle in the housing 20. The refrigerant 13 is circulated to the phosphor layer 11 through gaps in the refrigerant transport member 52 provided along the inner wall of the housing 20. The refrigerant 13 evaporates in the phosphor layer 11 and the evaporated refrigerant 13 is discharged to the space 52S formed at the middle of the housing 20.

It is to be noted that the wavelength conversion element 1F according to the present modification example includes particles each having light transmissivity in the refrigerant transport member 52. This makes it possible to configure a transmissive wavelength conversion element. Examples of the particles each having light transmissivity include $SiO_2$-based glass, alumina ($Al_2O_3$), and the like. In a case where the refrigerant transport member 52 includes particles each having light transmissivity, portions of the phosphor layer 11 or portions in contact with a surface 42S of the cover glass 42 and the surface 41S of the rear cover 41A in specific terms may include particles included in the refrigerant transport member 52.

Figure 20:
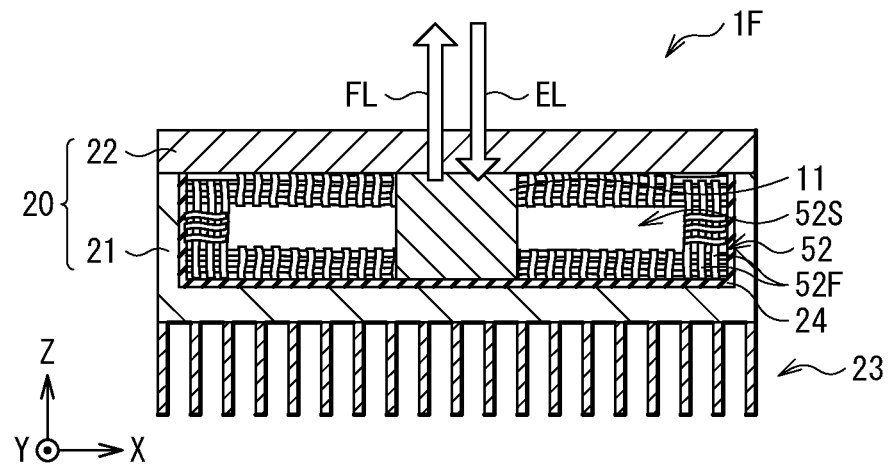
FIG. 20 is a cross-sectional schematic diagram illustrating another example of a configuration of a wavelength conversion element according to a modification example 7 of the present disclosure.

In addition, the refrigerant transport member 52 may include, for example, a fibrous structure 52F in addition to the plurality of particles 52X. FIG. 20 schematically illustrates a cross-sectional configuration of the wavelength conversion element 1F including the refrigerant transport member 52 including the fibrous structure 52F. Examples of a material of the fibrous structure 52F include metal such as aluminum (Al), copper (Cu), and stainless steel, a resin, glass, ceramic, or the like. The fibrous structure 52F may include one of the materials described above or a combination of two or more of the materials described above. It is to be noted that, in a case where a material which may elute metal ions in the refrigerant 13 or may be corroded by the refrigerant 13 is used as the refrigerant transport member 52, it is preferable to cover the surface of the material with a protective layer 54Y as described above. The same applies in a case where the refrigerant transport member 32 is formed by using an aluminum (Al) substrate, a copper (Cu) substrate, or the like as with the wavelength conversion element 1B according to the modification example 1 described above.

3. Second Embodiment

Figure 21:
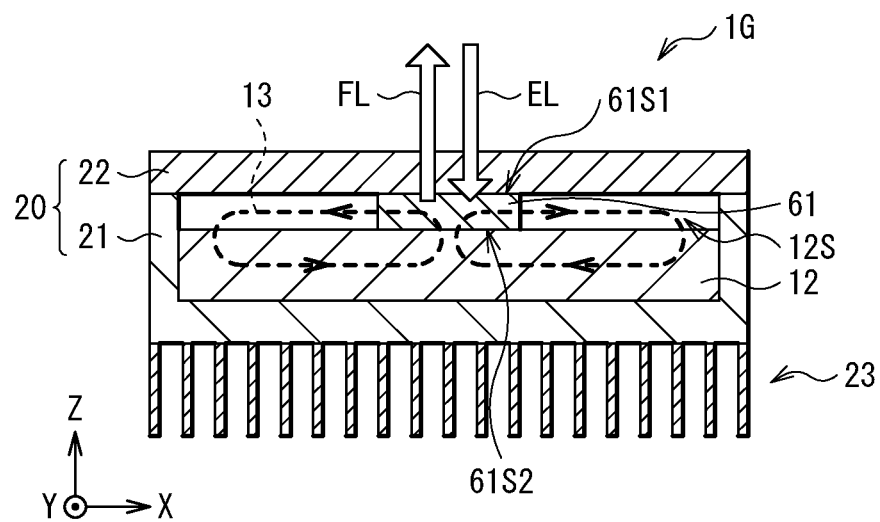
FIG. 21 is a cross-sectional schematic diagram illustrating an example of a configuration of a wavelength conversion element according to a second embodiment of the present disclosure.
Figure 22:
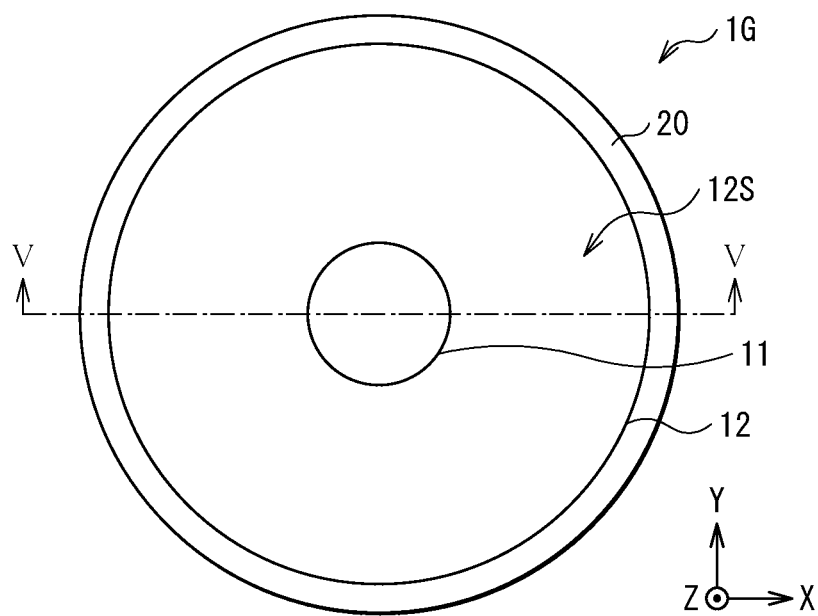
FIG. 22 is a plane schematic diagram of the wavelength conversion element illustrated in FIG. 21.

FIG. 21 schematically illustrates an example of a cross-sectional configuration of a wavelength conversion element (wavelength conversion element 1G) according to a second embodiment of the present disclosure. FIG. 22 schematically illustrates a planar configuration of the wavelength conversion element 1G illustrated in FIG. 21. FIG. 21 illustrates a cross-sectional configuration taken along a V-V line illustrated in FIG. 22. This wavelength conversion element 1G is included, for example, in a light source module (light source module 100) of a projection display apparatus (projector 1000) described below (see FIGS. 32 to 38). The wavelength conversion element 1G according to the present embodiment has a configuration in which the phosphor layer 61 and the refrigerant transport member 12 are encapsulated in the housing 20 along with the refrigerant 13. The phosphor layer 61 and the refrigerant transport member 12 are stacked together. The phosphor layer 61 is directly cooled by the evaporative latent heat of the refrigerant 13.

3-1. Configuration of Wavelength Conversion Element

As described above, the wavelength conversion element 1G according to the present embodiment has a so-called two-phase cooling structure in which the phosphor layer 61 and the refrigerant transport member 12 are encapsulated in the housing 20 along with the refrigerant 13. The phosphor layer 61 is directly cooled by the evaporative latent heat of the refrigerant 13. The housing 20 includes, for example, the storage section 21 and the cover glass 22. The cover glass 22 has light transmissivity and seals the internal space of the storage section 21 in combination with the storage section 21. The heat dissipation member 23 is provided on the back surface of the storage section 21. In the present embodiment, the phosphor layer 61 is configured to be different in average pore size between a surface 61S1 opposed to the cover glass 22 and a surface 61S2 opposed to the refrigerant transport member 12.

The phosphor layer 61 includes a plurality of phosphor particles. It is preferable that the phosphor layer 61 be formed, for example, as an open-cell porous layer. Although described in detail below, it is preferable that the size (average pore size) of the pores be smaller than the average pore size of the refrigerant transport member 12 that is also formed as an open-cell porous layer. For example, an average pore size of 30 μm or less is preferable. It is preferable that the phosphor layer 61 be formed, for example, to have a plate shape or a cylindrical shape. The phosphor layer 61 includes, for example, so-called ceramic phosphors or binder-type porous phosphors.

Each of the phosphor particles is a particle-shaped phosphor that absorbs the excitation light EL radiated from the light source section 110 described below to emit the fluorescent light FL. For example, as a phosphor particle, a fluorescent material is used that is excited by blue laser light having a wavelength in the blue wavelength range (e.g., 400 nm to 470 nm) to emit yellow fluorescent light (light in a wavelength range between the red wavelength range and the green wavelength range). Examples of such a fluorescent substance include an YAG (yttrium/aluminum/garnet)-based material. For example, phosphor particles have an average particle size of 10 μm or more and 100 μm or less.

It is preferable that the phosphor layer 61 have a smaller diameter, for example, than that of the refrigerant transport member 12 and have a space (space 12S) between a side surface of the phosphor layer 61 and the side wall of the housing 20 (storage section 21). This efficiently circulates the refrigerant 13 in a cooling cycle of the wavelength conversion element 1G described below. In addition, it is preferable that a portion of the surface 61S1 of the phosphor layer 61 corresponding to at least a light emitting section be in contact with or bonded to the cover glass 22 in the storage section 21. The surface 61S1 is disposed to be opposed to the cover glass 22. The light emitting section converts the excitation light EL into the fluorescent light FL. This makes it possible to prevent a droplet from adhering to the surface 22S of the cover glass 22 right opposed to the light emitting section and prevent the excitation light EL and the fluorescent light FL from being scattered by the droplet.

Further, the phosphor layer 61 is configured to be different in average pore size between the surface 61S1 opposed to the cover glass 22 and the surface 61S2 opposed to the refrigerant transport member 12 as described above. For example, the phosphor layer 61 has a porous structure in which the phosphor layer 61 changes in average pore size from the surface 61S2 to a surface 62S1. This surface 61S2 corresponds to a specific example of "one surface" according to the present disclosure and the surface 62S1 corresponds to a specific example of "another surface or the other surface" according to the present disclosure.

Figure 23:
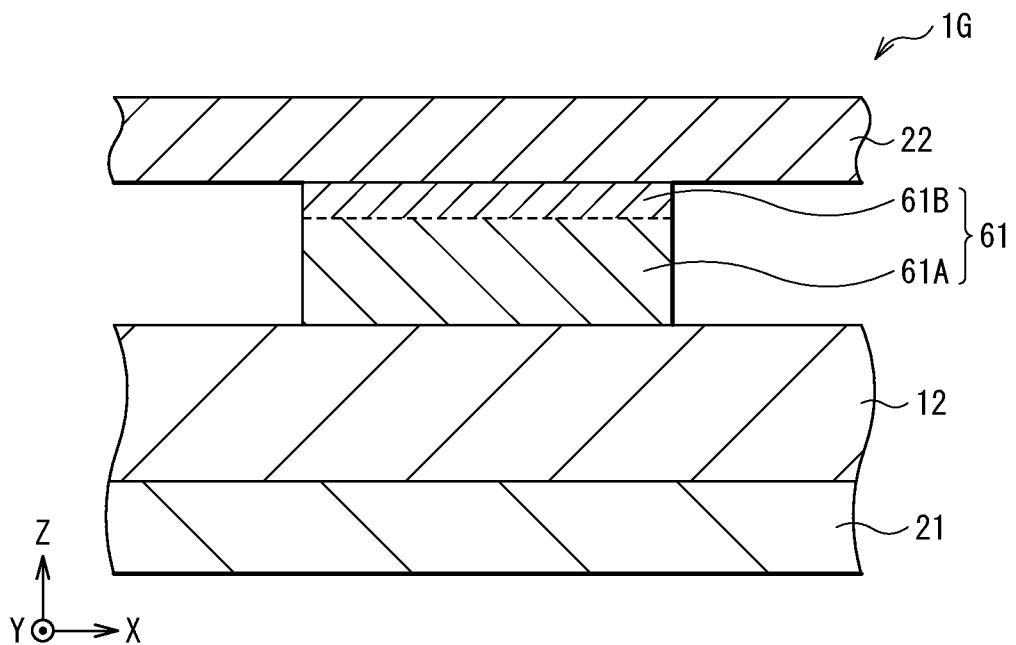
FIG. 23 is an enlarged schematic diagram illustrating an example of a configuration of a main portion of the wavelength conversion element illustrated in FIG. 21.
Figure 24:
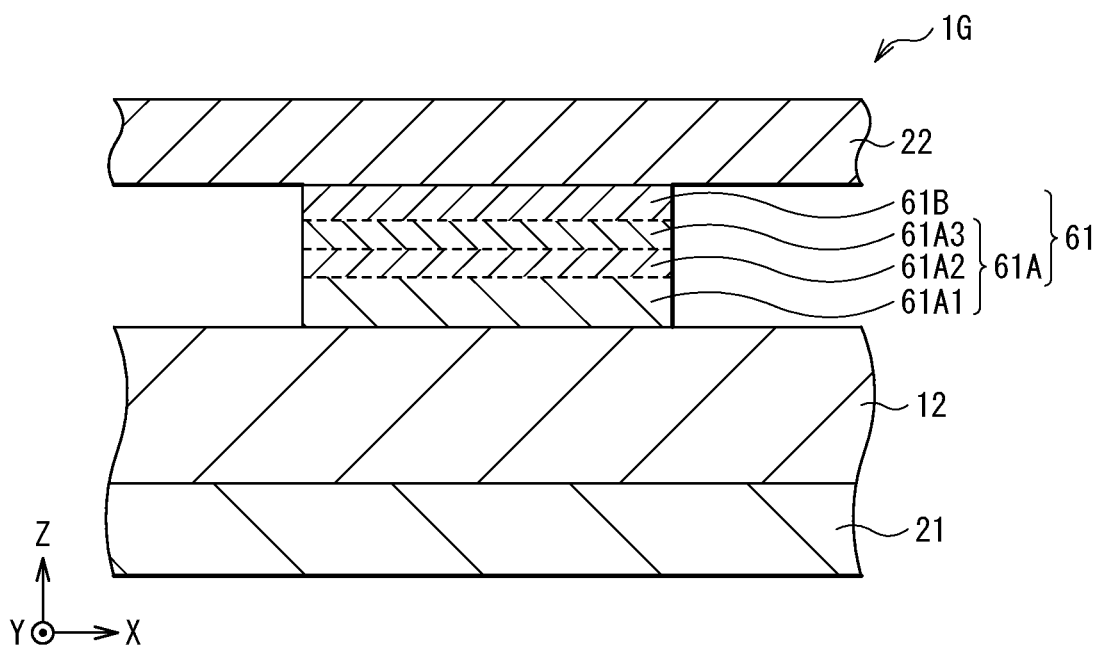
FIG. 24 is an enlarged schematic diagram illustrating another example of a configuration of a main portion of the wavelength conversion element illustrated in FIG. 21.

Each of FIGS. 23 and 24 is an enlarged view of a cross-sectional configuration of the phosphor layer 61 and the region around the phosphor layer 61. The phosphor layer 61 is the main portion of the wavelength conversion element 1F according to the present embodiment. The phosphor layer 61 illustrated in FIG. 23 has a stacked structure in which a first layer 61A and a second layer 61B are stacked in this order from the refrigerant transport member 12 side. The first layer 61A has a predetermined average pore size. The second layer 61B has a higher particle density than that of the first layer 61A. The second layer 61B includes a light emitting section that converts the radiated excitation light EL into the fluorescent light FL. For example, it is preferable that the second layer 61B have a pore-less structure in which there is no gap (pore) inside. This makes it possible to prevent a foreign object from entering the light emitting section. In addition, the first layer 61A does not contribute to light emission. The first layer 61A does not necessarily have to be formed by using phosphor particles as long as it is possible to include an open-cell porous layer.

In the phosphor layer 61 illustrated in FIG. 24, the first layer 61A has a multilayered structure in which a plurality of layers (e.g., three layers 61A1, 61A2, and 61A3) is stacked that is different from each other in average pore size. The layers 61A1, 61A2, and 61A3 are stacked to gradually decrease in average pore size along the direction in which the refrigerant 13 flows. In other words, among the layers 61A1, 61A2, and 61A3, the layer 61A1 has the greatest average pore size, the layer 61A2 has an average pore size smaller than that of the layer 61A1 and greater than that of the layer 61A3, and the layer 61A3 has the smallest average pore layer. This makes it possible to suppress an increase in flow path resistance in the phosphor layer 11 and increase capillary force toward the light emitting section of the phosphor layer 11. As a result, it is possible to increase the maximum amount of heat to be transported.

The refrigerant transport member 12 is for carrying the refrigerant 13 to the phosphor layer 61. It is preferable that the refrigerant transport member 12 be formed as an open-cell porous layer as with the phosphor layer 61. It is preferable that the average pore size of the refrigerant transport member 12 be greater than the average pore size of the phosphor layer 61.

The wavelength conversion element 1G according to the present embodiment is a so-called reflective wavelength conversion element that extracts the fluorescent light FL by reflecting the fluorescent light FL, for example, in the same direction as the direction in which the excitation light EL is inputted. The fluorescent light FL is emitted from the phosphor layer 61 irradiated with the excitation light EL. It is therefore preferable that the refrigerant transport member 12 further have light reflectivity. For example, the use of an inorganic material such as a metal material or a ceramic material is preferable. Examples of a material included in the refrigerant transport member 12 include a single metal such as aluminum (Al), copper (Cu), molybdenum (Mo), tungsten (W), cobalt (Co), chromium (Cr), platinum (Pt), tantalum (Ta), lithium (Li), zirconium (Zr), ruthenium (Ru), rhodium (Rh), or palladium (Pd) or an alloy including one or more of these. The refrigerant transport member 12 includes a sintered ceramic compact, a sintered metal, or a porous metal including, for example, the material described above.

The refrigerant 13 circulates between the phosphor layer 61 and the refrigerant transport member 12 to cool the phosphor particles heated by being irradiated with the excitation light EL. For example, it is preferable that a liquid having great latent heat be used for the refrigerant 13. In addition, the refrigerant 13 circulates through gaps formed in the phosphor layer 61 and the refrigerant transport member 12. It is therefore preferable that the refrigerant 13 have low viscosity. Specific examples of the refrigerant 13 include water, acetone, methanol, naphthalin, benzene, and the like.

One surface of the housing 20 includes a material having light transmissivity. It is possible to form a sealed space (internal space) in the housing 20. As described above, the housing 20 includes the storage section 21 and the cover glass 22 that forms a sealed space in combination with the storage section 21 and corresponds to the one surface described above. This cover glass 22 corresponds to a specific example of the "sealing section" according to the present disclosure. The storage section 21 stores the phosphor layer 11, the refrigerant transport member 12, and the refrigerant 13. The phosphor layer 11 and the refrigerant transport member 12 are disposed to cause the phosphor layer 11 to be opposed to the cover glass 22 side, for example, in FIG. 1, but this is not limitative. As a material included in the housing 20, for example, aluminum, copper, stainless steel, low-carbon steel, an alloy material thereof, and the like are used for the storage section 21. In addition to a glass substrate, for example, soda glass, quartz, sapphire glass, crystal, and the like are used for the cover glass 22. In addition, in a case where the light source section 110 outputs laser light with low output power, resins and the like are used such as polyethylene terephthalate (PET), a silicone resin, polycarbonate, and acryl.

The opposite surface of the housing 20 to the one surface or the back surface of the storage section 21 is provided with the heat dissipation member 23. The heat dissipation member 23 is for cooling the storage section 21. This condenses the vapor of the refrigerant 13 on the inner surface side of the storage section 21 to bring about a phase change into liquid and the liquid is transported to the phosphor layer 61 by the refrigerant transport member 12. It is possible to use a plurality of heat dissipation fins as the heat dissipation member 23, but this is not limitative. For example, a Peltier element or a water cooling element may be used, for example, as the heat dissipation member 23.

In a case where the phosphor layer 61 and the refrigerant transport member 12 are each formed by using a sintered compact, control over predetermined parameters in the manufacturing steps of each of the sintered compacts offers a desired average pore size as described in the first embodiment described above. With regard to the phosphor layer 61 in which a plurality of layers (the first layer 61A (61A1, 61A2, and 61A3) and the second layer 61B) is stacked that is different from each other in average pore size, phosphor particles having predetermined particle sizes corresponding to the respective layers 61A1, 61A2, and 61A3 are sorted out, for example, by classifying phosphors (step S101) and sintered phosphors having desired average particle sizes are then each created through steps S102 to S105 as in the present embodiment. After that, the respective sintered phosphors are stacked, thereby completing the phosphor layer 61 that gradually decreases in average pore size along the direction in which the refrigerant 13 flows. It is to be noted that the average pore size of gaps (pores) formed in the phosphor layer 61 is proportional to the particle size of phosphor particles included in the phosphor layer 61. The use of phosphor particles each having a larger particle size offers the phosphor layer 61 that is large in average pore size.

It is also possible to manufacture the phosphor layer 61 by using a method as follows. For example, phosphor particles each having a desired particle size are sorted out by classifying phosphors. Pellets having phosphor particles disposed in a mold to obtain desired pore size space distribution are molded and calcined. This collectively forms the respective layers (first layer 61A (layers 61A1, 61A2, and 61A3)) included in the phosphor layer 61 along the direction in which the refrigerant 13 flows. The phosphor layer 61 gradually decreases in average pore size. It is to be noted that it is possible to adjust the particle size of phosphor particles by using a fabrication condition in addition to classification.

The cooling cycle of the wavelength conversion element 1G according to the present embodiment is described. First, in a case where the phosphor layer 61 is irradiated with the excitation light EL, the phosphor particles generate heat. The refrigerant 13 is evaporated by that heat and concurrently takes the latent heat away. In a case where the middle portion of the phosphor layer 61 is irradiated with the excitation light EL as illustrated in FIG. 21, the evaporated refrigerant 13 moves to the outer peripheral side (space 12S) of the phosphor layer 61 as vapor. The vapor that has moved to the space 12S dissipates the latent heat through the inner wall of the storage section 21 and is liquidized again. The liquidized refrigerant 13 is transported to the phosphor layer 61 by the capillary force of the refrigerant transport member 12 and moved immediately below the heated section (light emitting section) of the phosphor layer 61 (e.g., layer 61A3) by the capillary force of the phosphor layer 61. The heat generated through the radiation of the excitation light EL is discharged to the refrigerant transport member 12 by repeating this.

3-2. Workings and Effects

As described above, in recent years, laser excitation phosphors have been used as light sources in projection display apparatuses (projectors). The laser excitation phosphor light sources have an issue with an increase in the cooling efficiency of phosphors. The two-phase flow cooling technology (phase change cooling technology) that uses latent heat has attracted attention. The two-phase flow cooling technology allows a refrigerant to directly cool a light emitting particle of a phosphor or a light emitting region. The two-phase flow cooling technology, however, has issues with the contamination of phosphors by eluates from a material included in a sealed housing that encapsulates the phosphors and a refrigerant and a decrease in light output power caused by the contamination.

In contrast, the present embodiment has a multilayered structure in which the refrigerant transport member 12 side and the cover glass 22 side are different in average pore size. The cover glass 22 side includes a light emitting section that converts the radiated excitation light EL into the fluorescent light FL. Specifically, the first layer 61A and the second layer 61B are stacked in this order from the refrigerant transport member 12 side. The first layer 61A has a predetermined average pore size smaller than that of the refrigerant transport member 12. The second layer 61B includes a light emitting section and has a higher particle density than that of the first layer 61A. This facilitates the refrigerant 13 to flow into the phosphor layer 61 and makes it possible to increase the cooling efficiency of the phosphor layer 61. Further, the light emitting section and the region (the second layer 61B in the present embodiment) near the light emitting section are increased in particle density. Preferably, the light emitting section and the region (the second layer 61B in the present embodiment) near the light emitting section have a pore-less structure. This suppresses the entry of a foreign object included in the refrigerant 13 such as an eluate to the light emitting section from a material included in the housing 20 and makes it possible to prevent the light emitting section and the region near the light emitting section from being contaminated.

In addition, the two-phase flow cooling technology circulates a refrigerant by using the capillary force caused by gaps (pores) in a phosphor layer, but a collision between the flow of a refrigerant in a vapor state and the flow of a liquid refrigerant serves as flow path resistance in the layer. In a case where more heat is charged, the refrigerant in the layer circulates at higher speed. The flow path resistance caused by the collision described above increases prominently. As a result, the total flow path resistance exceeds the total capillary force, causing dry-out.

In contrast, in the present embodiment, for example, as illustrated in FIG. 24, the first layer 61A includes a plurality of layers (e.g., the three layers 61A1, 61A2, and 61A3) that is different from each other in average pore size. The plurality of layers is stacked to gradually decrease in average pore size along the direction in which the refrigerant 13 flows. This makes it possible to suppress an increase in the flow path resistance and increase the capillary force.

Figure 25:
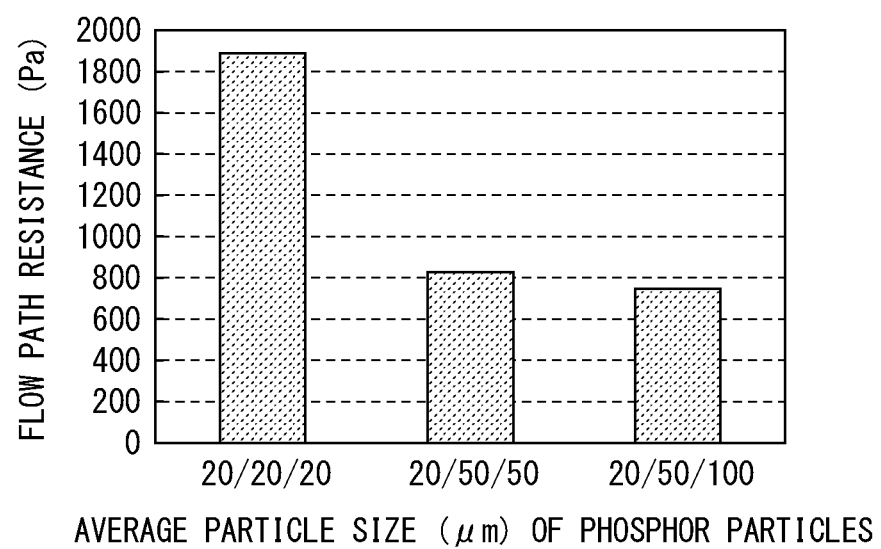
FIG. 25 is a characteristic diagram illustrating flow path resistance relative to an average particle size of phosphor particles.

FIG. 25 organizes the flow path resistance, for example, in a case where a cylindrical sintered phosphor having φ 5 mm and a height of 3 mm is divided into layers each having 1 mm in the height direction and the particle size distribution of the phosphor particles is set as follows. FIG. 25 illustrates that gradually decreasing the particle size distribution (average pore size) toward the light emitting section allows the flow path resistance to decrease in a sample A (20/20/20), a sample B (20/50/50), and a sample C (20/50/100). In the sample A (20/20/20), all of the layers have an average particle size of 20 m. In the sample B (20/50/50), a layer including the light emitting section has an average particle size of 20 μm and the other two layers have an average particle size of 50 m. In the sample C (20/50/100), the layers have average particle sizes of 20 m, 50 m, and 100 μm from the layer including the light emitting section.

As described above, the wavelength conversion element 1G according to the present embodiment is provided with the phosphor layer 61 having a porous structure in which the first layer 61A and the second layer 61B are stacked in order from the refrigerant transport member 12 side. The second layer 61B including a light emitting section that converts the excitation light EL into the fluorescent light FL is smaller in average pore size than the first layer 61A disposed on the refrigerant transport member 12 side. Alternatively, the second layer 61B has a pore-less structure. This increases the cooling performance and prevents a foreign object from contaminating the light emitting section, making it possible to achieve a wavelength conversion element having high output power and high reliability.

In addition, in the present embodiment, the first layer 61A disposed on the refrigerant transport member 12 side has a multilayered structure in which, for example, a plurality of layers (e.g., the layer 61A1, the layer 61A2, and the layer 61A3) is included that gradually decreases in average pore size along the flow of the refrigerant. This makes it possible to suppress an increase in the flow path resistance and increase the capillary force. This further increases the cooling performance and makes it possible to further increase the output power.

4. Modification Examples

In the second embodiment or the like described above, the wavelength conversion element 1G has been described that includes the phosphor layer 61 having a cylindrical shape and having a multilayered structure in which a plurality of layers is stacked in the Z axis direction, but the phosphor layer 61 may be configured as follows.

4-1. Modification Example 7

Figure 26:
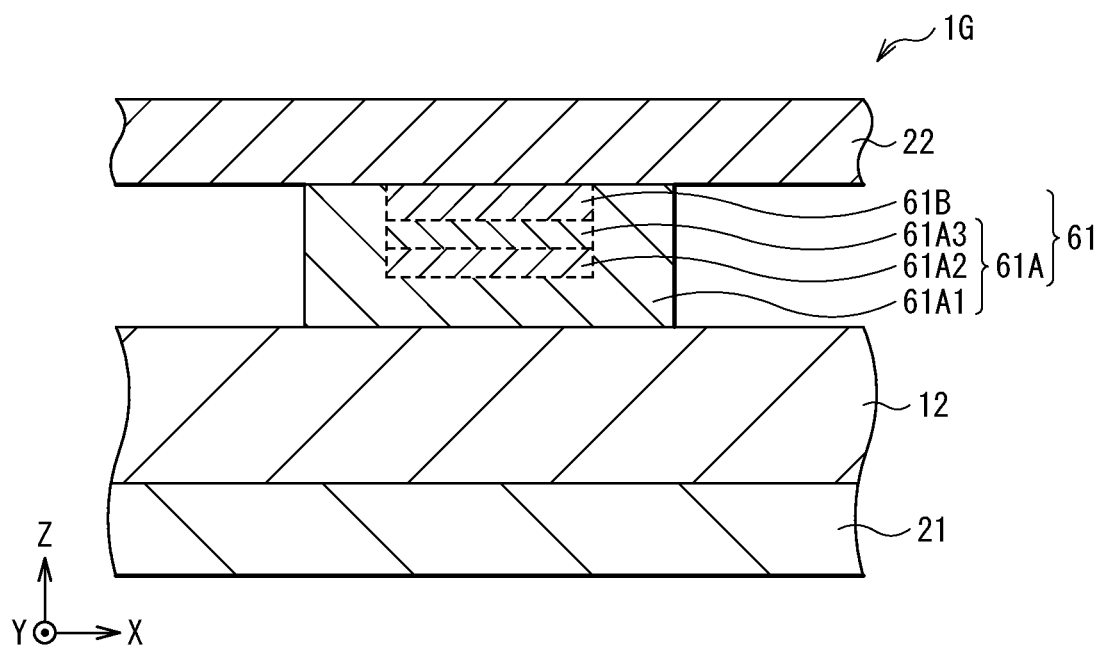
FIG. 26 is a cross-sectional schematic diagram of the wavelength conversion element according to the modification example 7 of the present disclosure.

FIG. 26 schematically illustrates another example of a cross-sectional configuration of the main portion of the wavelength conversion element 1G serving as a modification example of the second embodiment described above. The phosphor layer 61 illustrated in FIG. 26 has the pore-less second layer 61B limited to the minimum area that contributes light emission. Specifically, the phosphor layer 61 has a configuration in which the side surfaces of the second layer 61B and the layers 61A2 and 61A3 included in the first layer 61A are covered with the layer 61A1 having the largest average pore size. In other words, the phosphor layer 61 according to the present modification example is configured to have a region on a side surface of the phosphor layer 11 including the light emitting section in a plan view. The region has a greater average pore size than that of the light emitting section.

As described above, a region having a greater average pore size than that of the second layer 61B is provided around the second layer 61B including the light emitting section in a plan view. The refrigerant 13 is evaporated and changed into vapor by the heat generated by the phosphor particles in the light emitting section and the region near the light emitting section, decreasing the flow path resistance to discharge the vapor refrigerant 13 to the space 12S. In addition, increasing the average pore size around the second layer 61B including the light emitting section causes the flows of the refrigerant 13 in a vapor state and the liquid refrigerant 13 to be rectified by the balance of capillary force. The inflow of the refrigerant 13 is suppressed around the light emitting section or, for example, from the outer periphery of the second layer 61B according to the second embodiment described above far from the light emitting section to the light emitting section. This suppresses an increase in the flow path resistance due to the interference between the respective flows and makes it possible to further increase the output power and the reliability.

4-2. Modification Example 8

Figure 27:
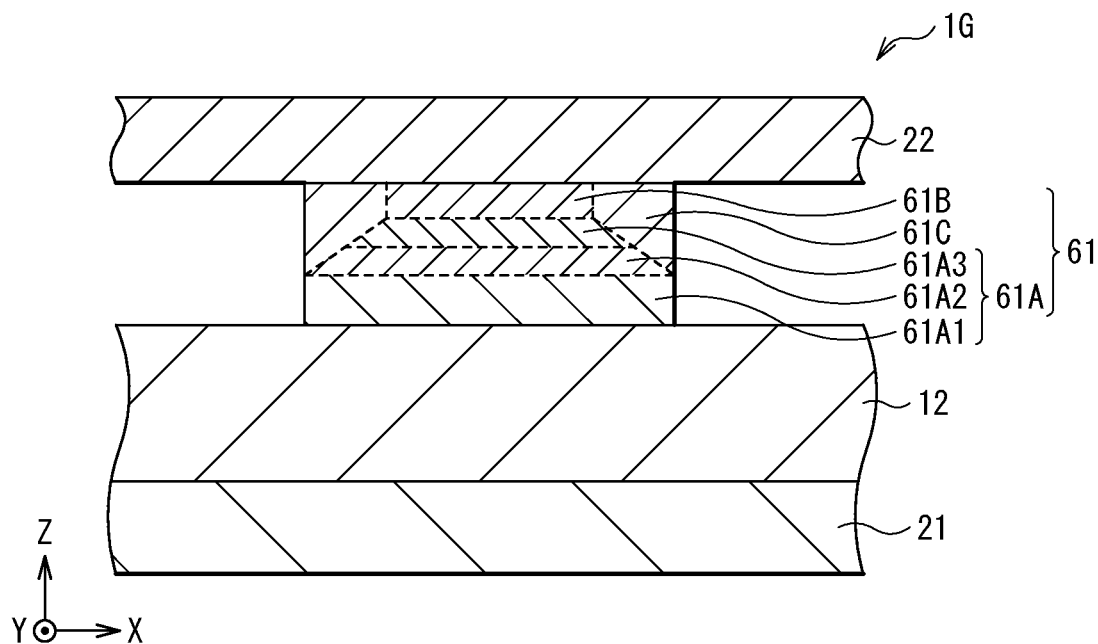
FIG. 27 is a cross-sectional schematic diagram of a wavelength conversion element according to a modification example 8 of the present disclosure.

FIG. 27 schematically illustrates another example of the cross-sectional configuration of the main portion of the wavelength conversion element 1G serving as a modification example of the second embodiment described above. The phosphor layer 61 illustrated in FIG. 27 has the second layer 61B limited to the minimum area that contributes light emission as in the modification example 7 described above and has a configuration in which the side surfaces of the layers 61A2 and 61A3 included in the first layer 61A are processed to be tapered and the side surfaces including the second layer 61B are provided, for example, with a layer 61C having a greater average pore size than that of the layer 61A. This layer 61C corresponds to a specific example of a "refrigerant discharge region" according to the present disclosure.

As described above, the second layer 61B including the light emitting section has the minimum diameter that contributes light emission. Further, each of the layers (layers 61A2 and 61A3) between the layer 61A and the second layer 61B has a tapered shape. The side surfaces of the layers 61A2 and 61A3 and the second layer 61B are provided with the layer 61C having a greater average pore size than that of the layer 61A. This makes it possible to further decrease the flow path resistance of the refrigerant 13 in a vapor state. This makes it expectable to increase the maximum amount of heat to be transported and makes it possible to further increase the output power and the reliability.

4-3. Modification Example 9

Figure 28:
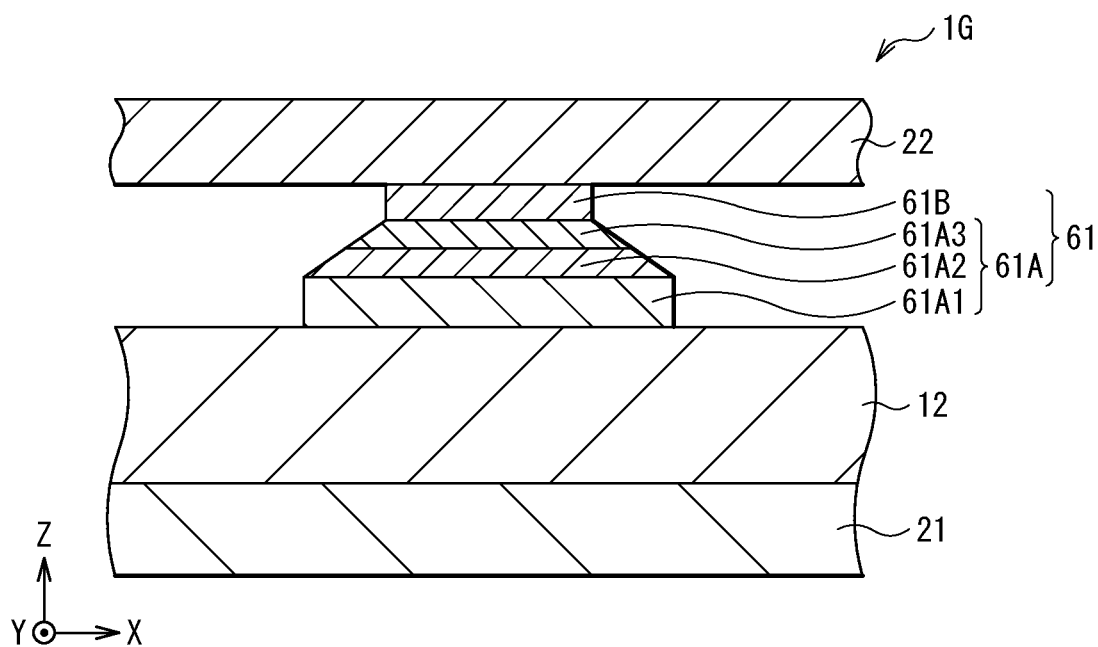
FIG. 28 is a cross-sectional schematic diagram of a wavelength conversion element according to a modification example 9 of the present disclosure.

FIG. 28 schematically illustrates another example of the cross-sectional configuration of the main portion of the wavelength conversion element 1G serving as a modification example of the second embodiment described above. The phosphor layer 61 illustrated in FIG. 28 is not provided with the layer 61C provided in the modification example 8 described above. The layers 61A2 and 61A3 and the second layer 61B have nothing around the side surfaces. This evaporates and changes the refrigerant 13 into vapor by the heat generated by the phosphor particles in the light emitting section and the region near the light emitting section. The vapor refrigerant 13 is directly discharged to the space 12S. It is thus possible to further decrease the flow path resistance of the refrigerant 13 in a vapor state. This makes it expectable to further increase the maximum amount of heat to be transported.

4-4. Modification Example 10

Figure 29:
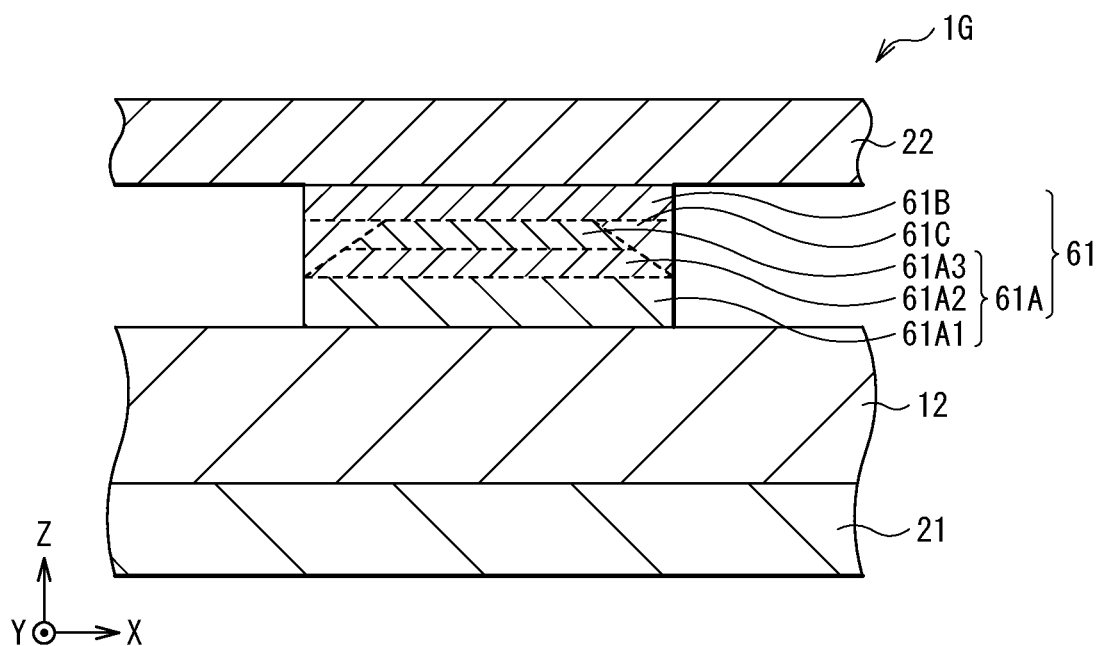
FIG. 29 is a cross-sectional schematic diagram of a wavelength conversion element according to a modification example 10 of the present disclosure.

FIG. 29 schematically illustrates another example of the cross-sectional configuration of the main portion of the wavelength conversion element 1G serving as a modification example of the second embodiment described above. Each of the layers 61A1, 61A2, 61A3, and 61C does not necessarily have to be formed by using phosphor particles. For example, each of the layers 61A1, 61A2, 61A3, and 61C may be formed by using a porous material having high thermal conductivity. Specifically, each of the layers 61A1, 61A2, 61A3, and 61C according to the present modification example may include, for example, a sintered ceramic compact, a sintered metal, or a porous metal including a material mentioned for the refrigerant transport member 12. This makes it possible to further increase the heat dissipation performance. It is to be noted that the layer 61C does not have to be provided as in the modification example 9 described above.

4-5. Modification Example 11

Figure 30:
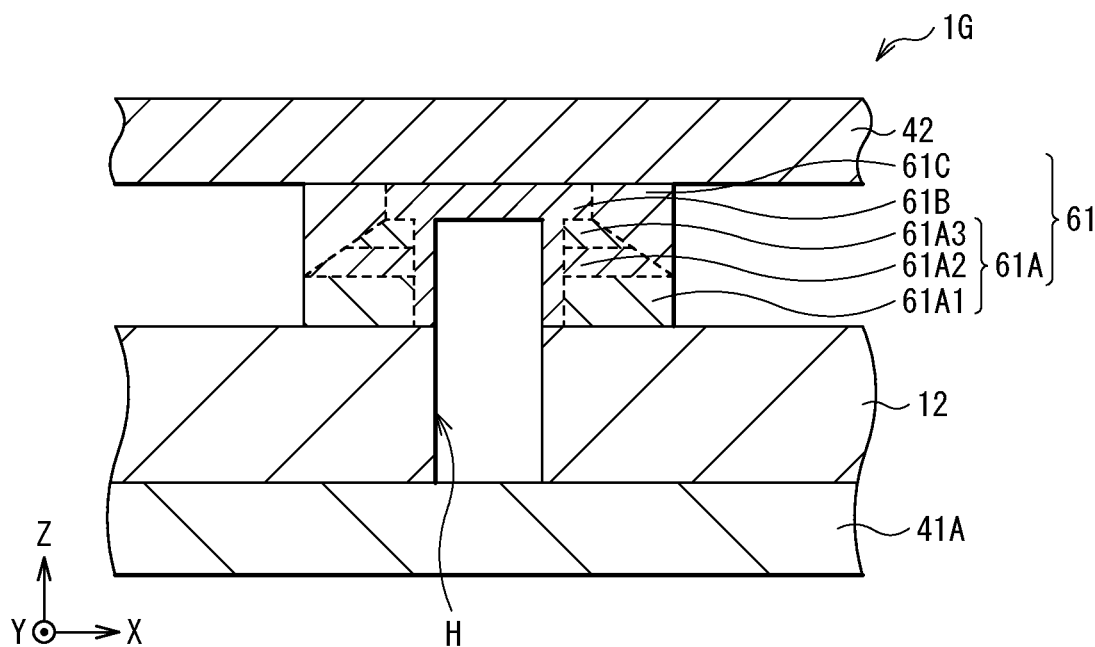
FIG. 30 is a cross-sectional schematic diagram of a wavelength conversion element according to a modification example 11 of the present disclosure.

FIG. 30 schematically illustrates another example of the cross-sectional configuration of the main portion of the wavelength conversion element 1G serving as a modification example of the second embodiment described above. It is also possible to include the wavelength conversion element 1G in a transmissive wavelength conversion element. In a case of a transmissive wavelength conversion element, as illustrated in FIG. 30, there is provided an opening H at a position in the first layer 61A and the refrigerant transport member 12 corresponding to the light emitting section of the second layer 61B. This makes it possible to extract the fluorescent light FL from the opposite side (e.g., rear cover 41A side) to the incidence side (e.g., cover glass 42 side) of the excitation light EL.

It is to be noted that, in a case where the first layer 61A having gaps (pores) inside is provided with the opening H as in the present modification example, it is preferable that each of the side surfaces opposed to the opening H be pore-less. This makes it possible to prevent the refrigerant 13 from flowing into the opening H. The refrigerant 13 is evaporated and changed into vapor by the heat generated by the phosphor particles in the light emitting section and the region near the light emitting section. This makes it possible to suppress a decrease in the light extraction efficiency caused by a droplet adhering to the opening.

4-6. Modification Example 12

Figure 31:
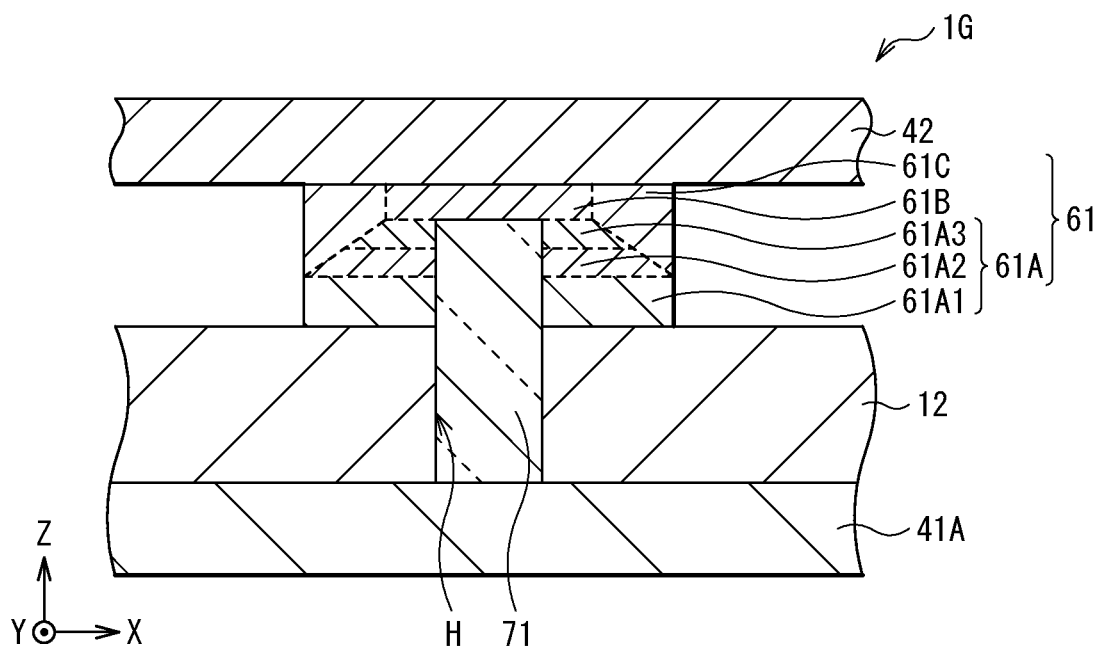
FIG. 31 is a cross-sectional schematic diagram of a wavelength conversion element according to a modification example 12 of the present disclosure.

FIG. 31 schematically illustrates another example of the cross-sectional configuration of the main portion of the wavelength conversion element 1G serving as a modification example of the second embodiment described above. The wavelength conversion element 1G according to the present modification example has glass 71 disposed in the opening H formed in the modification example 11 described above. In this way, disposing the glass 71 in the opening H makes it possible to prevent the refrigerant 13 in a vapor state from flowing into the opening H. This makes it possible to more easily prevent the refrigerant 13 in a vapor state from flowing into the opening as compared with a case of a pore-less side surface opposed to the opening H.

It is to be noted that it is sufficient if the glass 71 is a member having light transmissivity. The glass is not limitative. For example, sapphire or the like may be used. In addition, the second embodiment and the modification examples 7 to 12 described above are also applicable, for example, to phosphor wheels (wavelength conversion elements 1D and 1E) each of which is rotatable around a rotation axis (e.g., axis J51) as illustrated in FIGS. 11 and 13. It is possible to obtain effects similar to those of the second embodiment and the modification examples 7 to 12 described above.

4-7. Modification Example 13

Figure 32:
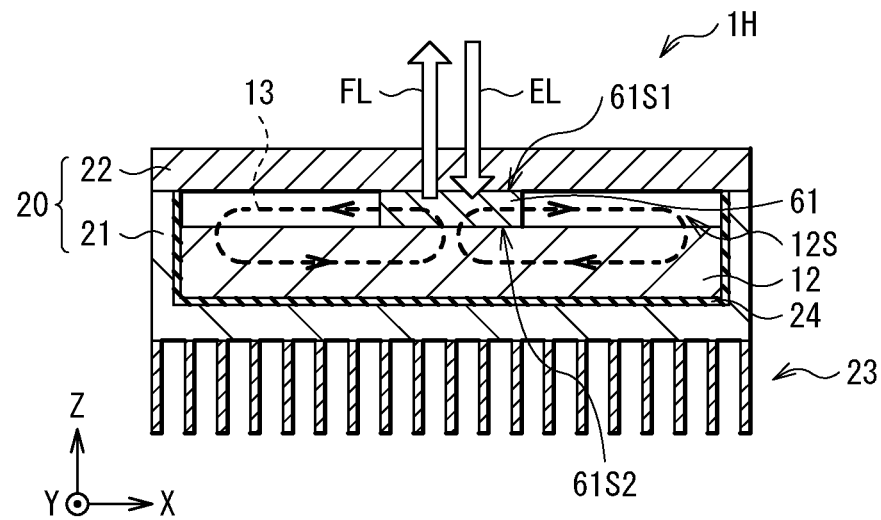
FIG. 32 is a cross-sectional schematic diagram of a wavelength conversion element according to a modification example 13 of the present disclosure.

FIG. 32 schematically illustrates an example of a cross-sectional configuration of a wavelength conversion element (wavelength conversion element 1H) according to a combination of the first embodiment described above and the second embodiment described above. The wavelength conversion element 1H according to the present modification example includes the phosphor layer 61 in which the surface 61S1 opposed to the cover glass 22 and the surface 61S2 opposed to the refrigerant transport member 12 are different in average pore size, for example, as in the second embodiment described above. The protective layer 24 is provided on the inner wall of the storage section 21 as in the first embodiment described above.

In this way, the phosphor layer 61 is provided, for example, with average pore size distribution that decreases along the flow of the refrigerant 13. The inner wall of the storage section 21 is provided with the protective layer 24 that prevents the storage section 21 and the refrigerant 13 from coming into direct contact. This makes it possible to further prevent the light emitting section from being contaminated by the elution or the like of a material included in the storage section 21 in the refrigerant 13. It is thus possible to achieve a wavelength conversion element having higher output power and higher reliability.

It is to be noted that the example of the combination of the first embodiment described above and the second embodiment described above has been described in the present modification example, but it is possible to combine the first and second embodiments and the modification examples 1 to 12 described above with each other. For example, the modification example 5 described above and the second embodiment described above may be combined and the protective layer 24 of the wavelength conversion element 1G described above may also be formed on the cover glass 22 side. This makes it possible to obtain an effect of allowing stray light to be suppressed in addition to the effect according to the present modification example.

5. Application Example (Configuration Example 1 of Light Source Module)

Figure 33:
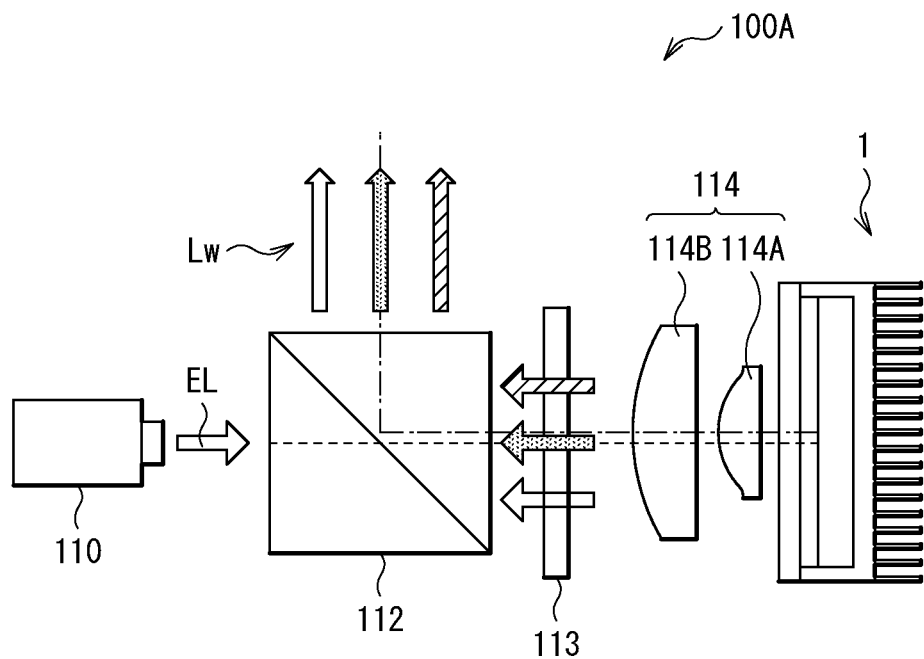

FIG. 33 is an outline diagram illustrating an overall configuration of an example (light source module 100A) of the light source module 100 included, for example, in the projector 1000 described below. The light source module 100A includes the wavelength conversion element 1 (any of the wavelength conversion elements 1A to 1H described above), the light source section 110, a polarizing beam splitter (PBS) 112, a quarter-wave plate 113, and a condensing optical system 114. The respective members included in the light source module 100A described above are disposed on an optical path of light (combined light Lw) emitted from the wavelength conversion element 1 in the order of the condensing optical system 114, the quarter-wave plate 113, and the PBS 112 from the wavelength conversion element 1 side. The light source section 110 is disposed at a position opposed to one light incidence surface of the PBS 112 in the direction orthogonal to the optical path of the combined light Lw.

The light source section 110 includes a solid-state light emitting element that emits light having a predetermined wavelength. In the present embodiment, a semiconductor laser element that oscillates the excitation light EL (e.g., blue laser light having a wavelength of 445 nm or 455 nm) is used as a solid-state light emitting element. The linearly-polarized (S-polarized) excitation light EL is emitted from the light source section 110.

It is to be noted that, in a case where the light source section 110 includes a semiconductor laser element, the excitation light EL having predetermined output power may be obtained by one semiconductor laser element, but the excitation light EL having the predetermined output power may be obtained by combining the pieces of light outputted from a plurality of semiconductor laser elements. Further, the wavelength of the excitation light EL is not limited to the numeric value described above. Any wavelength may be used as long as the wavelength falls within the wavelength band of light that is referred to as blue light.

The PBS 112 is for separating the excitation light EL inputted from the light source section 110 and the combined light Lw inputted from the wavelength conversion element 1. Specifically, the PBS 112 reflects the excitation light EL inputted from the light source section 110 toward the quarter-wave plate 113. In addition, the PBS 112 transmits the combined light Lw that has been inputted from the wavelength conversion element 1 through the condensing optical system 114 and the quarter-wave plate 113. The transmitted combined light Lw is inputted to an illumination optical system 200 (described below).

The quarter-wave plate 113 is a phase difference element that causes incident light to have a phase difference of π/2. In a case where the incident light is linearly-polarized light, the linearly-polarized light is converted into circularly-polarized light. In a case where the incident light is circularly-polarized light, the circularly-polarized light is converted into linearly-polarized light. The linearly-polarized excitation light EL emitted from the polarizing beam splitter 112 is converted by the quarter-wave plate 113 into the circularly-polarized excitation light EL. In addition, the circularly-polarized excitation light component included in the combined light Lw emitted from the wavelength conversion element 1 is converted by the quarter-wave plate 113 into linearly-polarized light.

The condensing optical system 114 condenses the excitation light EL emitted from the quarter-wave plate 113 in a predetermined spot diameter and emits the condensed excitation light EL toward the wavelength conversion element 1. In addition, the condensing optical system 114 converts the combined light Lw emitted from the wavelength conversion element 1 into parallel light and emits the parallel light toward the quarter-wave plate 113. It is to be noted that the condensing optical system 114 may include, for example, one collimating lens or may have a configuration in which incident light is converted into parallel light by using a plurality of lenses.

It is to be noted that the configuration of an optical member that separates the excitation light EL inputted from the light source section 110 and the combined light Lw outputted from the wavelength conversion element 1 is not limited to that of the PBS 112. It is possible to use any optical member as long as the configuration thereof allows for the light separating operation described above.

(Configuration Example 2 of Light Source Module)

Figure 34:
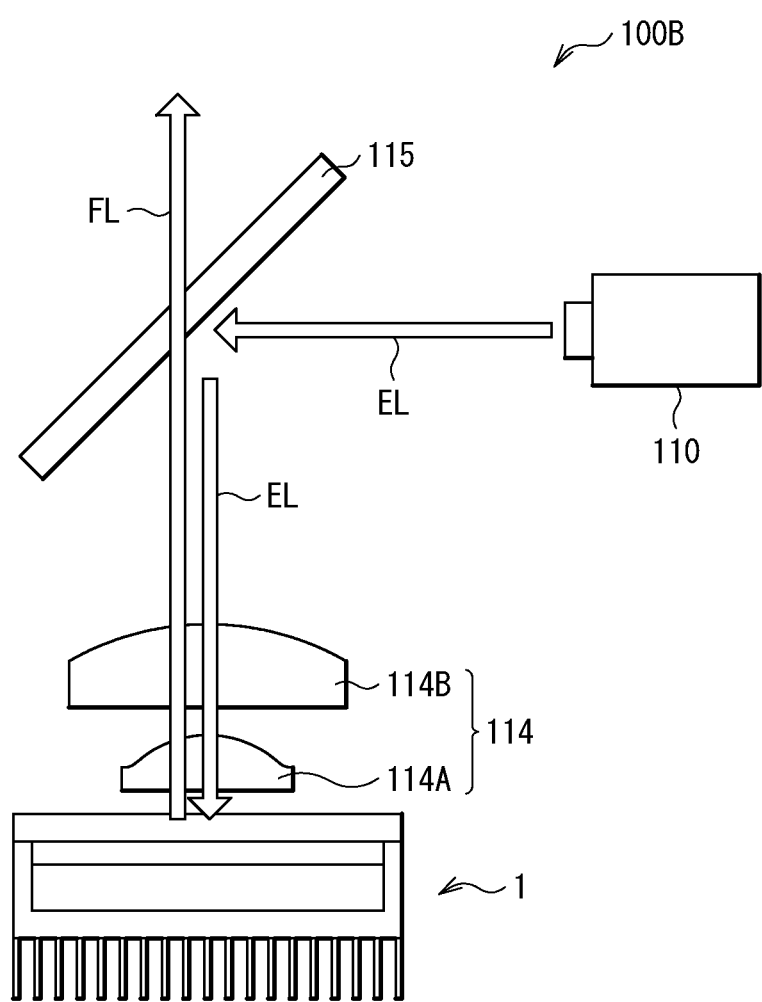

FIG. 34 is an outline diagram illustrating an overall configuration of another example (light source module 100B) of the light source module 100.

The light source module 100B includes the wavelength conversion element 1, the light source section 110, a dichroic mirror 115, and the condensing optical system 114. The respective members included in the light source module 100C described above are disposed on an optical path of light (combined light Lw) emitted from the wavelength conversion element 1 in the order of the condensing optical system 114, the quarter-wave plate 113, and the PBS 112 from the wavelength conversion element 1 side. The light source section 110 is disposed at a position in the direction orthogonal to the optical path of the combined light Lw at which the excitation light EL is reflected by the dichroic mirror 115 toward the wavelength conversion element 1.

(Configuration Example 3 of Light Source Module)

Figure 35:
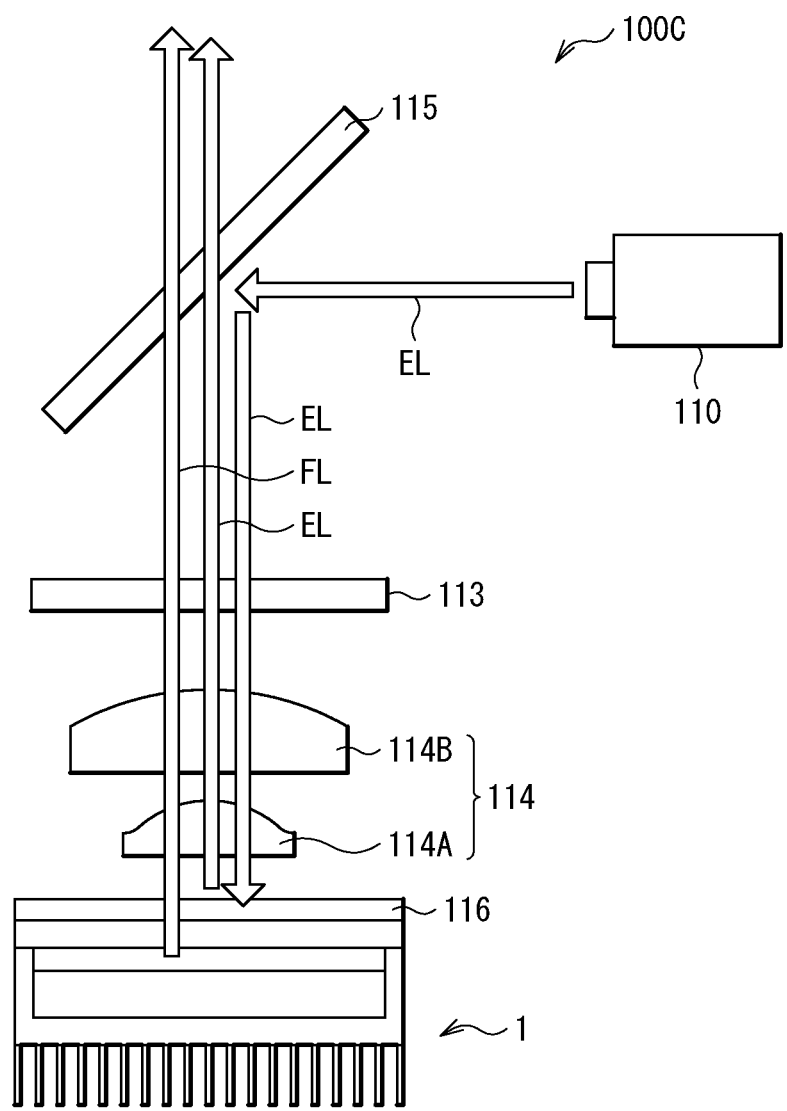

FIG. 35 is an outline diagram illustrating an overall configuration of another example (light source module 100C) of the light source module 100.

The light source module 100C includes the wavelength conversion element 1, the light source section 110, the dichroic mirror 115, the quarter-wave plate 113, and the condensing optical system 114. The respective members included in the light source module 100C described above are disposed on an optical path of light (combined light Lw) emitted from the wavelength conversion element 1 in the order of the condensing optical system 114, the quarter-wave plate 113, and the dichroic mirror 115 from the wavelength conversion element 1 side. A dichroic mirror 116 is further disposed on the front surface (e.g., on the cover glass 22) of the wavelength conversion element 1. This reflects a portion of the excitation light EL (blue light). The reflected excitation light EL (blue light) is combined with the fluorescent light FL (yellow light) to generate white light.

(Configuration Example 4 of Light Source Module)

Figure 36:
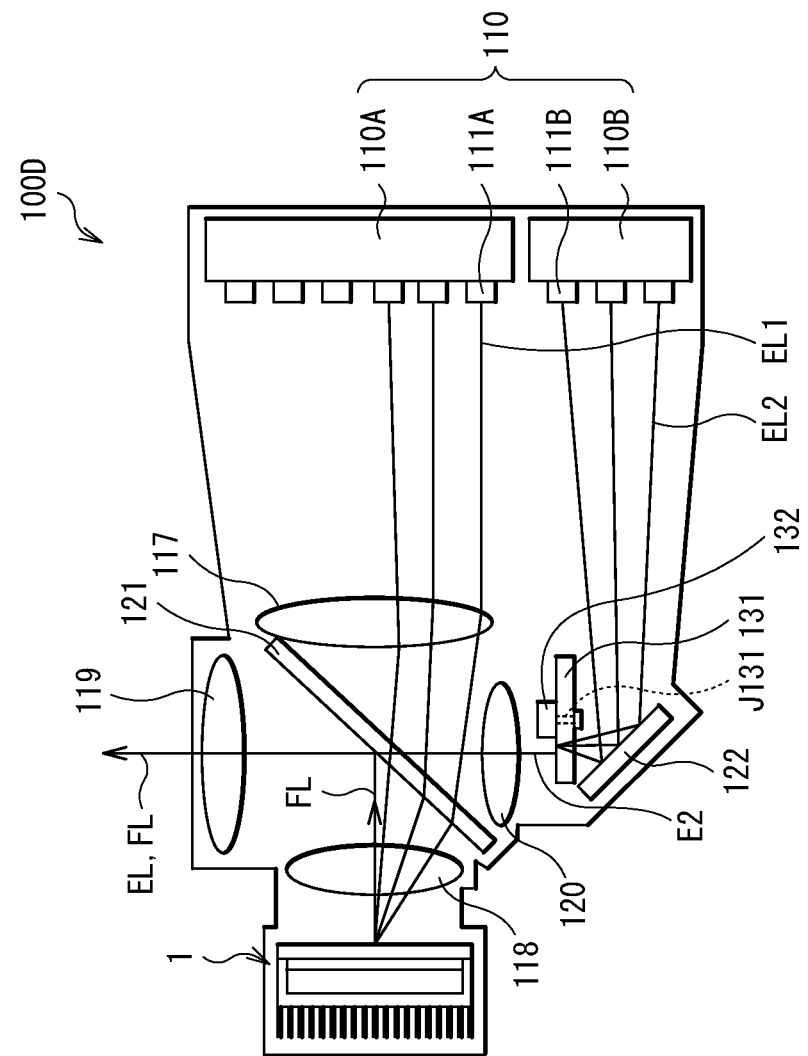

FIG. 36 is an outline diagram illustrating an overall configuration of another example (light source module 100D) of the light source module 100.

The light source module 100D includes the wavelength conversion element 1, a diffusion plate 131, the light source section 110 that emits excitation light or laser light, lenses 117 to 120, a dichroic mirror 121, and a reflecting mirror 122. The diffusion plate 131 is rotatably supported by a shaft J131 and rotated and driven, for example, by a motor 132. The light source section 110 includes a first laser group 110A and a second laser group 110B. A plurality of semiconductor laser elements 111A each of which oscillates excitation light (e.g., a wavelength of 445 nm or 455 nm) is arranged in the first laser group 110A. A plurality of semiconductor laser elements 111B each of which oscillates blue laser light (e.g., a wavelength of 465 nm) is arranged in the second laser group 110B. Here, for the sake of convenience, the excitation light that is oscillated from the first laser group 110A is defined as EL1 and blue laser light (that is simply referred to as blue light) that is oscillated from the second laser group 110B is defined as EL2.

In the light source module 100D, the wavelength conversion element 1 is disposed to input the excitation light EL1 to the phosphor layer 11. The excitation light EL1 has passed through the lens 117, the dichroic mirror 121, and the lens 118 in order from the first laser group 110A. The fluorescent light FL from the wavelength conversion element 1 is reflected by the dichroic mirror 121. After that, the fluorescent light FL passes through the lens 119 and travels to the outside. In other words, the fluorescent light FL travels to the illumination optical system 200 described below. The diffusion plate 131 diffuses the blue light EL2 that has passed through the reflecting mirror 122 from the second laser group 110B. The blue light EL2 diffused by the diffusion plate 131 passes through the lens 120 and the dichroic mirror 121. After that, the blue light EL2 passes through the lens 119 and travels to the outside. In other words, the blue light EL2 travels to the illumination optical system 200.

(Configuration Example 1 of Projector)

Figure 37:
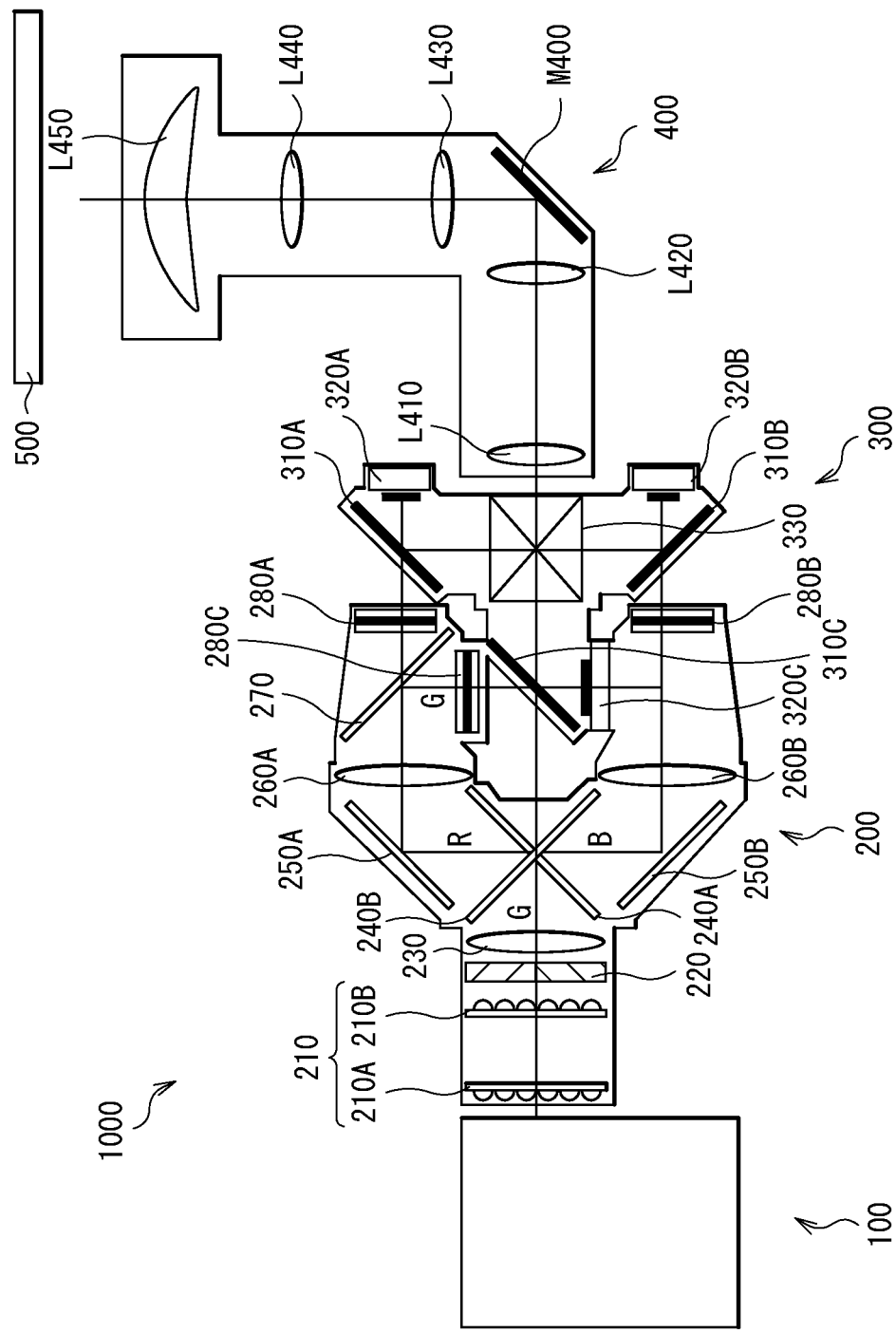

FIG. 37 is an outline diagram illustrating an overall configuration of the projector 1000 including the light source module 100 (any of the light source modules 100A to 100D described above) illustrated in FIG. 33 or the like as a light source optical system. It is to be noted that the following gives description by exemplifying a reflective 3LCD projector that performs light modulation by a reflective liquid crystal panel (LCD).

As illustrated in FIG. 37, the projector 1000 includes the light source module 100 described above, the illumination optical system 200, an image forming section 300, and a projecting optical system 400 (projection optical system) in order.

The illumination optical system 200 includes, for example, a fly eye lens 210 (210A and 210B), a polarization conversion element 220, a lens 230, dichroic mirrors 240A and 240B, reflecting mirrors 250A and 250B, lenses 260A and 260B, a dichroic mirror 270, and polarizing plates 280A to 280C from positions closer to the light source module 100.

The fly eye lens 210 (210A and 210B) achieves uniform distribution of illumination of white light from the light source module 100. The polarization conversion element 220 functions to align the polarization axis of incident light with a predetermined direction. For example, light other than P-polarized light is converted into P-polarized light. The lens 230 condenses light from the polarization conversion element 220 toward the dichroic mirrors 240A and 240B. Each of the dichroic mirrors 240A and 240B selectively reflects light in a predetermined wavelength range and selectively transmits the pieces of light in the other wavelength ranges. For example, the dichroic mirror 240A mainly reflects red light in the direction of the reflecting mirror 250A. In addition, the dichroic mirror 240B mainly reflects blue light in the direction of the reflecting mirror 250B. Mainly green light thus passes through both of the dichroic mirrors 240A and 240B and travels to a reflective polarizing plate 310C (described below) of the image forming section 300. The reflecting mirror 250A reflects light (mainly red light) from the dichroic mirror 240A toward the lens 260A and the reflecting mirror 250B reflects light (mainly blue light) from the dichroic mirror 240B toward the lens 260B. The lens 260A transmits light (mainly red light) from the reflecting mirror 250A and condenses the light on the dichroic mirror 270. The lens 260B transmits light (mainly blue light) from the reflecting mirror 250B and condenses the light on the dichroic mirror 270. The dichroic mirror 270 selectively reflects green light and selectively transmits the pieces of light in the other wavelength ranges. Here, the dichroic mirror 270 transmits the red light component of light from the lens 260A. In a case where the light from the lens 260A includes a green light component, the green light component is reflected toward the polarizing plate 280C. Each of the polarizing plates 280A to 280C includes a polarizer having a polarization axis in a predetermined direction. For example, in a case where light is converted into P-polarized light by the polarization conversion element 220, each of the polarizing plates 280A to 280C transmits the P-polarized light and reflects S-polarized light.

The image forming section 300 includes reflective polarizing plates 310A to 310C, reflective liquid crystal panels 320A to 320C (light modulation elements), and a dichroic prism 330.

The reflective polarizing plates 310A to 310C respectively transmit pieces of light (e.g., pieces of P-polarized light) having the same polarization axes as the polarization axes of the pieces of polarized light from the polarizing plates 280A to 280C and reflect pieces of light (pieces of S-polarized light) having the other polarization axes. Specifically, the reflective polarizing plate 310A transmits P-polarized red light from the polarizing plate 280A in the direction of the reflective liquid crystal panel 320A. The reflective polarizing plate 310B transmits P-polarized blue light from the polarizing plate 280B in the direction of the reflective liquid crystal panel 320B. The reflective polarizing plate 310C transmits P-polarized green light from the polarizing plate 280C in the direction of the reflective liquid crystal panel 320C. In addition, the P-polarized green light that has passed through both of the dichroic mirrors 240A and 240B and has been inputted to the reflective polarizing plate 310C passes through the reflective polarizing plate 310C as it is and is inputted to the dichroic prism 330. Further, the reflective polarizing plate 310A reflects S-polarized red light from the reflective liquid crystal panel 320A and inputs the S-polarized red light to the dichroic prism 330. The reflective polarizing plate 310B reflects S-polarized blue light from the reflective liquid crystal panel 320B and inputs the S-polarized blue light to the dichroic prism 330. The reflective polarizing plate 310C reflects S-polarized green light from the reflective liquid crystal panel 320C and inputs the S-polarized green light to the dichroic prism 330.

The reflective liquid crystal panels 320A to 320C perform spatial modulation on red light, blue light, or green light, respectively.

The dichroic prism 330 combines red light, blue light, and green light that are inputted thereto and emits the combined light toward the projecting optical system 400.

The projecting optical system 400 includes lenses L410 to L450 and a mirror M400. The projecting optical system 400 enlarges light outputted from the image forming section 300 to project it onto a screen 460 or the like.

(Operations of Light Source Module and Projector)

Next, an operation of the projector 1000 including the light source module 100 is described with reference to FIGS. 33 and 37.

First, the excitation light EL is oscillated from the light source section 110 toward the PBS. The excitation light EL is reflected by the PBS 112 and then passes through the quarter-wave plate 113 and the condensing optical system 114 in this order. The wavelength conversion element 1A is irradiated with the excitation light EL.

In the wavelength conversion element 1A, a portion of the excitation light EL (blue light) is absorbed in the phosphor layer 11 and is converted into light (fluorescent light FL; yellow light) in a predetermined wavelength band. The fluorescent light FL emitted from the phosphor layer 11 is diffused along with a portion of the excitation light EL that is not absorbed in the phosphor layer 11 and is reflected toward the condensing optical system 114 side. As a result, the fluorescent light FL and a portion of the excitation light EL are combined to generate white light in the wavelength conversion element 1A. This white light (combined light Lw) is outputted toward the condensing optical system 114.

After that, the combined light Lw passes through the condensing optical system 114, the quarter-wave plate 113, and the PBS 112 and is inputted to the illumination optical system 200.

The combined light Lw (white light) inputted from the light source module 100 (light source module 100A) sequentially passes through the fly eye lens 210 (210A and 210B), the polarization conversion element 220, and the lens 230 and then reaches the dichroic mirrors 240A and 240B.

The dichroic mirror 240A mainly reflects red light. This red light sequentially passes through the reflecting mirror 250A, the lens 260A, the dichroic mirror 270, the polarizing plate 280A, and the reflective polarizing plate 310A and reaches the reflective liquid crystal panel 320A. This red light is subjected to spatial modulation at the reflective liquid crystal panel 320A and then reflected by the reflective polarizing plate 310A to be inputted to the dichroic prism 330. It is to be noted that, in a case where light reflected toward the reflecting mirror 250A by the dichroic mirror 240A includes a green light component, the green light component is reflected by the dichroic mirror 270 and sequentially passes through the polarizing plate 280C and the reflective polarizing plate 310C to reach the reflective liquid crystal panel 320C. The dichroic mirror 240B mainly reflects blue light. The blue light is inputted to the dichroic prism 330 through a similar process. The green light that has passed through the dichroic mirrors 240A and 240B is also inputted to the dichroic prism 330.

The red light, the blue light, and the green light inputted to the dichroic prism 330 are combined and then emitted toward the projecting optical system 400 as image light. The projecting optical system 400 enlarges image light from the image forming section 300 to project it onto a screen 500 or the like.

(Configuration Example 2 of Projector)

Figure 38:
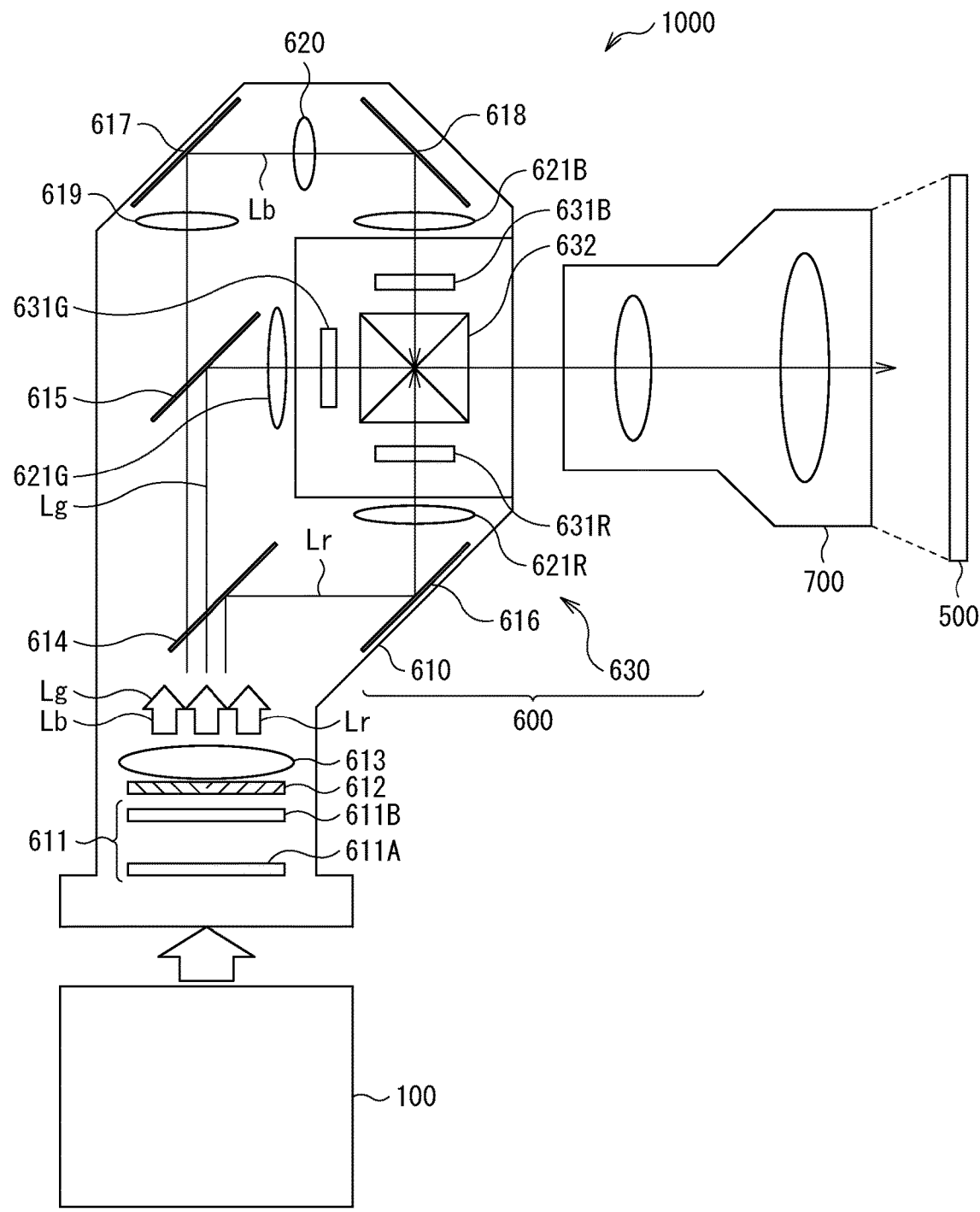

FIG. 38 is an outline diagram illustrating an example of a configuration of a transmissive 3LCD projection display apparatus (projector 1000) that performs light modulation by a transmissive liquid crystal panel. This projector 1000 includes, for example, the light source module 100, an image generation system 600 including an illumination optical system 610 and an image generation section 630, and a projection optical system 700.

The illumination optical system 610 includes, for example, an integrator element 611, a polarization conversion element 612, and a condensing lens 613. The integrator element 611 includes a first fly eye lens 611A including a plurality of microlenses arranged two-dimensionally and a second fly eye lens 611B including a plurality of microlenses arranged in association with the microlenses one by one.

Light (parallel light) inputted to the integrator element 611 from the light source module 100 is divided into a plurality of light fluxes by the microlenses of the first fly eye lens 611A. Images of the light fluxes are formed on the respective corresponding microlenses of the second fly eye lens 611B. The microlenses of the second fly eye lens 611B each function as a secondary light source and irradiate the polarization conversion element 612 with a plurality of pieces of parallel light having uniform luminance as incident light.

The integrator element 611 has a function of arranging the incident light with which the polarization conversion element 612 is irradiated from the light source module 100 as light having uniform luminance distribution as a whole.

The polarization conversion element 612 has a function of causing the incident light inputted through the integrator element 611 or the like to have a uniform polarization state. For example, this polarization conversion element 612 outputs output light including blue light Lb, green light Lg, and red light Lr through a lens and the like disposed on the output side of the light source module 100.

The illumination optical system 610 further includes a dichroic mirror 614 and a dichroic mirror 615, a mirror 616, a mirror 617 and a mirror 618, a relay lens 619 and a relay lens 620, a field lens 621R, a field lens 621G, and a field lens 621B, liquid crystal panels 631R, 631G, and 631B serving as the image generation section 630, and a dichroic prism 632.

The dichroic mirror 614 and the dichroic mirror 615 each have the property of selectively reflecting color light in a predetermined wavelength range and transmitting the pieces of light in the other wavelength ranges. For example, the dichroic mirror 614 selectively reflects the red light Lr. The dichroic mirror 615 selectively reflects the green light Lg of the green light Lg and the blue light Lb that have passed through the dichroic mirror 614. The remaining blue light Lb passes through the dichroic mirror 615. This separates light (e.g., white combined light Lw) outputted from the light source module 100 into a plurality of pieces of color light that is different in color.

The separated red light Lr is reflected by the mirror 616 and collimated by passing through the field lens 621R. After that, the red light Lr is inputted to the liquid crystal panel 631R for modulating red light. The green light Lg is collimated by passing through the field lens 621G and then inputted to the liquid crystal panel 631G for modulating green light. The blue light Lb is reflected by the mirror 617 through the relay lens 619 and further reflected by the mirror 618 through the relay lens 620. The blue light Lb reflected by the mirror 618 is collimated by passing through the field lens 621B and then inputted to the liquid crystal panel 631B for modulating the blue light Lb.

The liquid crystal panels 631R, 631G, and 631B are electrically coupled to an unillustrated signal source (e.g., PC or the like) that supplies an image signal including image information. The liquid crystal panels 631R, 631G, and 631B modulate incident light on a pixel-by-pixel basis on the basis of the supplied image signals of the respective colors and generate a red image, a green image, and a blue image, respectively. The pieces of modulated light (formed images) of the respective colors are combined by being inputted to the dichroic prism 632. The dichroic prism 632 superimposes and combines the pieces of light of the respective colors inputted from the three directions and outputs the combined light toward the projection optical system 700.

The projection optical system 700 includes, for example, a plurality of lenses and the like. The projection optical system 700 enlarges light outputted from the image generation system 600 and projects the light onto the screen 500.

Although the present disclosure has been described above with reference to the first and second embodiments and the modification examples 1 to 13, the present disclosure is not limited to the embodiment or the like described above. A variety of modifications are possible. For example, the material, thickness, and the like of each layer that have been described in the embodiments described above are merely examples, but this is not limitative. Another material and thickness may be adopted.

In addition, an apparatus other than the projector 1000 described above may be configured as the projection display apparatus according to the technology. For example, the example has been described in which a reflective liquid crystal panel or a transmissive liquid crystal panel is used as a light modulation element in the projector 1000 described above, but the present technology may also be applied to a projector including a digital micromirror device (DMD: Digital Micro-mirror Device) or the like.

Further, in the present technology, the wavelength conversion element 1, the light source module 100, and the like according to the present technology may be included in an apparatus that is not the projection display apparatus. For example, the light source module 100 according to the present disclosure may be used for illumination application and is applicable, for example, to a head lamp for an automobile and a light source for lighting up.

It is to be noted that the present technology may also have configurations as follows. This first technology provides the protective layer on at least the portion of the inner wall of the housing that encapsulates the phosphor layer, the refrigerant, and the refrigerant transport member. This suppresses contact between the refrigerant and the housing. This second technology having the following configurations changes the average pore size of gaps distributed in a phosphor layer having a porous structure from one surface to a light emitting section on another surface. This increases the efficiency of causing a refrigerant to flow into the phosphor layer and reduces the entry of foreign objects to the light emitting section and the region near the light emitting section. This makes it possible to provide a wavelength conversion element that makes it possible to increase the output power and the reliability. It is to be noted that the effects described here are not necessarily limited, but any of effects described in the present disclosure may be included.

[1]
A wavelength conversion element including:
a phosphor layer including a plurality of phosphor particles, the phosphor layer having a gap therein;
a refrigerant that cools the phosphor layer;
a refrigerant transport member provided in contact with the phosphor layer, the refrigerant transport member circulating the refrigerant; and
a housing that encapsulates the phosphor layer, the refrigerant, and the refrigerant transport member, the housing including a protective layer on at least a portion of an inner wall.

[2]
The wavelength conversion element according to [1], in which
the housing includes a storage section and a sealing section having light transmissivity, the storage section storing the phosphor layer, the refrigerant, and the refrigerant transport member, the sealing section defining an internal space in the housing in combination with the storage section, and
the protective layer is provided on an inner wall of the storage section.

[3]
The wavelength conversion element according to [2], in which the protective layer is further provided in a region other than a region opposed to the phosphor layer on one surface of the sealing section opposed to the internal space.

[4]
The wavelength conversion element according to [2] or [3], in which the protective layer on the storage section side is provided except for the region other than the region opposed to the phosphor layer.

[5]
The wavelength conversion element according to any one of [1] to [4], in which the protective layer is further provided on a surface of the refrigerant transport member.

[6]
The wavelength conversion element according to any one of [1] to [5], in which the protective layer includes a material or a surface structure having a high affinity with the refrigerant.

[7]
The wavelength conversion element according to any one of [1] to [6], in which the protective layer includes a single layer film or a multilayered film.

[8]
The wavelength conversion element according to any one of [1] to [7], in which the protective layer includes silicon oxide ($SiO_2$), aluminum oxide ($Al_2O_3$), or titanium oxide ($TiO_2$).

[9]
The wavelength conversion element according to any one of [1] to [7], in which the protective layer includes a metal material having a standard electrode potential of more than 0.35 V.

[10]
The wavelength conversion element according to any one of [1] to [7], in which the protective layer includes gold (Au), silver (Ag), or stainless steel.

[11]
The wavelength conversion element according to any one of [1] to [10], in which the refrigerant is circulated by capillary force generated in the phosphor layer and capillary force generated by the refrigerant transport member, and the capillary force in the phosphor layer is greater than the capillary force in the refrigerant transport member.

[12]
The wavelength conversion element according to any one of [1] to [11], in which the refrigerant transport member has light reflectivity.

[13]
The wavelength conversion element according to any one of [1] to [12], in which the phosphor layer has a space between the phosphor layer and a side wall of the housing.

[14]
The wavelength conversion element according to any one of [1] to [13], in which the phosphor layer has an open-cell porous structure.

[15]
The wavelength conversion element according to any one of [1] to [14], in which the phosphor layer includes a ceramic phosphor.

[16]
The wavelength conversion element according to any one of [1] to [15], in which the refrigerant transport member has an open-cell porous structure.

[17]
The wavelength conversion element according to any one of [1] to [16], in which the refrigerant transport member includes a sintered ceramic compact, a sintered metal, or a porous metal.

[18]
The wavelength conversion element according to any one of [1] to [16], in which the refrigerant transport member includes a plurality of particles or a fibrous structure.

[19]
The wavelength conversion element according to [18], in which the plurality of particles included in the refrigerant transport member each includes barium sulfate, titanium oxide, or alumina.

[20]
The wavelength conversion element according to [18], in which the fibrous structure included in the refrigerant transport member includes copper, aluminum, stainless steel, a resin, glass, or ceramic or a combination.

[21]
The wavelength conversion element according to any one of [1] to [20], in which the phosphor layer and the refrigerant transport member each have an open-cell porous structure, and an average pore size of the phosphor layer is smaller than an average pore size of the refrigerant transport member.

[22]
The wavelength conversion element according to any one of [1] to [21], in which the refrigerant transport member has a flow path on a contact surface with the phosphor layer, the flow path being for transporting the refrigerant.

[23]
The wavelength conversion element according to any one of [1] to [22], in which the phosphor layer is directly cooled by latent heat caused by vaporization of the refrigerant.

[24]
The wavelength conversion element according to any one of [2] to [23], in which the storage section includes a heat dissipation member on a back surface.

[25]
The wavelength conversion element according to any one of [1] to [24], in which the housing includes a rotatable wheel member and the phosphor layer has an annular shape.

[26]
The wavelength conversion element according to any one of [1] to [25], in which, in a case where the phosphor layer and the refrigerant transport member are used with respective surfaces of the phosphor layer and the refrigerant transport member standing upright, capillary force (P) in the refrigerant transport member satisfies the following expression (1):

(Expression 1)

$$P \geq \text{hydraulic head difference } R_0 (\text{mmH}_2\text{O}) \quad (1)$$

($R_0$: distance from a light emitting section in the phosphor layer to an inner side wall of the housing).

[27]
A wavelength conversion element including:
a phosphor layer including a plurality of phosphor particles, the phosphor layer having a porous structure therein, the porous structure changing in average pore size from one surface to a light emitting section on another surface;
a refrigerant that cools the phosphor layer;
a refrigerant transport member provided in contact with the phosphor layer, the refrigerant transport member circulating the refrigerant; and
a housing that encapsulates the phosphor layer, the refrigerant, and the refrigerant transport member.

[28]
The wavelength conversion element according to [27], in which the phosphor layer has a plurality of gaps, the plurality of gaps being distributed to gradually decrease in the average pore size from the one surface to the light emitting section on the other surface.

[29]
The wavelength conversion element according to [27] or [28], in which at least the light emitting section of the phosphor layer includes no gap.

[30]
The wavelength conversion element according to any one of [27] to [29], in which the phosphor layer has a refrigerant discharge region around the light emitting section, the refrigerant discharge region having gaps greater in average pore size than gaps of the light emitting section near the other surface.

[31]
The wavelength conversion element according to any one of [27] to [30], in which the phosphor layer has an inclined surface on at least a portion of a side surface.

[32]
The wavelength conversion element according to any one of [27] to [31], in which the phosphor layer includes a first layer and a second layer, the first layer including a plurality of phosphor particles, the second layer including a porous material that does not contribute to light emission, and a plurality of gaps is formed in the second layer, the plurality of gaps changing in average size from the one surface to the other surface.

[33]
The wavelength conversion element according to [32], in which the second layer includes a sintered ceramic compact, a sintered metal, or a porous metal.

[34]
The wavelength conversion element according to any one of [27] to [33], in which the refrigerant transport member is disposed on the one surface side of the phosphor layer and has an opening at a position opposed to the light emitting section and a light-transmissive member is disposed in the opening.

[35]
The wavelength conversion element according to [34], in which the light-transmissive member includes glass or sapphire.

[36]
The wavelength conversion element according to any one of [27] to [35], in which the housing further includes a protective layer on at least a portion of an inner wall.

This application claims the priority on the basis of Japanese Patent Application No. 2019-058236 filed with Japan Patent Office on Mar. 26, 2019, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

What is claimed is:
1. A wavelength conversion element, comprising:
    a phosphor layer including a plurality of phosphor particles, the phosphor layer having a porous structure therein, the porous structure changing in average pore size from one surface to a light emitting section on another surface, wherein the phosphor layer has a plurality of gaps, the plurality of gaps being distributed to gradually decrease in the average pore size from the one surface to the light emitting section on the other surface;
    a refrigerant that cools the phosphor layer;
    a refrigerant transport member provided below and in contact with the phosphor layer, the refrigerant transport member circulating the refrigerant; and a housing that encapsulates the phosphor layer, the refrigerant, and the refrigerant transport member, the housing including a protective layer on at least a portion of an inner wall.

2. The wavelength conversion element according to claim 1, wherein the housing includes a storage section and a sealing section having light transmissivity, the storage section storing the phosphor layer, the refrigerant, and the refrigerant transport member, the sealing section defining an internal space in the housing in combination with the storage section, and wherein the protective layer is provided on an inner wall of the storage section.

3. The wavelength conversion element according to claim 2, wherein the protective layer is provided in regions of the storage section and the sealing section other than regions opposed to the phosphor layer and is further provided on a surface of the refrigerant transport member, the storage section and the sealing section defining the internal space.

4. The wavelength conversion element according to claim 2, wherein the storage section includes a heat dissipation member on a back surface.

5. The wavelength conversion element according to claim 1, wherein the protective layer includes a metal material having a standard electrode potential of more than 0.35 V.

6. The wavelength conversion element according to claim 1, wherein the refrigerant is circulated by capillary force generated in the phosphor layer and capillary force generated by the refrigerant transport member, and wherein the capillary force in the phosphor layer is greater than the capillary force in the refrigerant transport member.

7. The wavelength conversion element according to claim 1, wherein the refrigerant transport member has light reflectivity.

8. The wavelength conversion element according to claim 1, wherein the phosphor layer has a space between the phosphor layer and a side wall of the housing.

9. The wavelength conversion element according to claim 1, wherein the phosphor layer and the refrigerant transport member each have an open-cell porous structure, and wherein an average pore size of the phosphor layer is smaller than an average pore size of the refrigerant transport member.

10. The wavelength conversion element according to claim 1, wherein the refrigerant transport member has a flow path on a contact surface with the phosphor layer, the flow path being for transporting the refrigerant.

11. The wavelength conversion element according to claim 1, wherein the phosphor layer is directly cooled by latent heat caused by vaporization of the refrigerant.

12. The wavelength conversion element according to claim 1, wherein the housing includes a rotatable wheel member and the phosphor layer has an annular shape.

13. The wavelength conversion element according to claim 1, wherein, in a case where the phosphor layer and the refrigerant transport member are used with respective surfaces of the phosphor layer and the refrigerant transport member standing upright, capillary force (P) in the refrigerant transport member satisfies the following expression:

$P \geq \text{difference in hydraulic head} * R_0$ ($R_0$ represents a distance from a light emitting section in the phosphor layer to an inner side wall of the housing).

14. A wavelength conversion element, comprising:
a phosphor layer including a plurality of phosphor particles, the phosphor layer having a porous structure therein, the porous structure changing in average pore size from one surface to a light emitting section on another surface, wherein the phosphor layer has a plurality of gaps, the plurality of gaps being distributed to gradually decrease in the average pore size from the one surface to the light emitting section on the other surface;
a refrigerant that cools the phosphor layer;
a refrigerant transport member provided below and in contact with the phosphor layer, the refrigerant transport member circulating the refrigerant; and
a housing that encapsulates the phosphor layer, the refrigerant, and the refrigerant transport member.

15. The wavelength conversion element according to claim 14, wherein at least the light emitting section of the phosphor layer includes no gap.

16. The wavelength conversion element according to claim 14, wherein the phosphor layer has a refrigerant discharge region around the light emitting section, the refrigerant discharge region having gaps greater in average pore size than gaps of the light emitting section near the other surface.

17. The wavelength conversion element according to claim 14, wherein the phosphor layer includes a first layer and a second layer, the first layer including a plurality of phosphor particles, the second layer including a porous material that does not contribute to light emission, and wherein a plurality of gaps is formed in the second layer, the plurality of gaps changing in average size from the one surface to the other surface.

18. The wavelength conversion element according to claim 14, wherein the refrigerant transport member is disposed on one surface side of the phosphor layer and has an opening at a position opposed to the light emitting section and a light-transmissive member is disposed in the opening.

19. The wavelength conversion element according to claim 14, wherein the housing further includes a protective layer on at least a portion of an inner wall.

* * * * *